ELECTRONIC CODE COMMUNICATION SYSTEM

Filed Feb. 3, 1955 19 Sheets-Sheet 1

GENERAL SYSTEM ORGANIZATION

INVENTOR.

H.C. SIBLEY

BY Forest B. Hitchcock

HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 2

INVENTOR.

H. C. SIBLEY

BY *Forest B. Hitchcock*

HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 3

INVENTOR.

H. C. SIBLEY

BY

Forest B. Hitchcock

HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 4

INVENTOR.
H. C. SIBLEY
BY Forest B. Hitchcock
HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 5

INVENTOR.

H. C. SIBLEY

BY Forest B. Hitchcock

HIS ATTORNEY

INVENTOR.
H.C. SIBLEY
BY
Forest B. Hitchcock
HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 7

INVENTOR.
H. C. SIBLEY
BY Forest B. Hitchcock
HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 8

INVENTOR.

H. C. SIBLEY

BY Forest B. Hitchcock

HIS ATTORNEY

INVENTOR.
H. C. SIBLEY
BY Forest B. Hitchcock
HIS ATTORNEY

INVENTOR.
H.C. SIBLEY
BY Forest B. Hitchcock
HIS ATTORNEY

INVENTOR.
H. C. SIBLEY
BY
Forest B. Hitchcock
HIS ATTORNEY

INVENTOR.
H.C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

Oct. 4, 1960 H. C. SIBLEY 2,955,278

ELECTRONIC CODE COMMUNICATION SYSTEM

Filed Feb. 3, 1955 19 Sheets-Sheet 15

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H.C. SIBLEY
BY Forest B. Hitchcock
HIS ATTORNEY 2,955,278

ELECTRONIC CODE COMMUNICATION SYSTEM

Henry C. Sibley, Spencerport, N.Y., assignor to General Railway Signal Company, Rochester, N.Y.

Filed Feb. 3, 1955, Ser. No. 485,973

6 Claims. (Cl. 340—163)

This invention relates to an electronic, pulse-type, code communication system. More particularly, it pertains to a communication system for use in railway signaling to transfer information about track occupancy and conditions of the switches, signals, and other devices as required from a plurality of field stations to a central office.

The high speed of operation possible with an electronic system and obtainable without the mechanical movement and resultant wear that occurs in relay type systems makes it practical to provide a continuous scanning system. In this kind of system, all the indications from the various stations are transmitted in succession to the central office once during each cycle of operation and with one cycle following another continuously. Since the scanning occurs at a rapid rate, the indications displayed at the central office always represent substantially fresh information.

In a scanning communication system, the indication code for any field station or particular group of stations is identified as belonging to that station or group merely by its place in the complete cycle of operation. This feature makes it unnecessary to transmit information about the identity of each station as it sends its indication code, although this is ordinarily required in code communication systems in which each station transmits only when it has a new indication to send to the central office.

One objection in the past to the use of electronic systems for railway signaling has been that they are complex and lack the reliability required for this kind of service. Also, because the various field stations usually are at remote locations where commercial power sources are not available or are not sufficiently reliable to be used as the only source of power, the field station apparatus must be organized to operate from a battery without loading it too heavily. This restriction made prior electronic systems impractical to use because they required too much power. To overcome these objections, this code communication system is organized to provide highly reliable operation with low power requirements, particularly at each field station. These features have been brought about in part through the use of various circuit organizations using cold cathode glow tubes which do not require any filament heating power and therefore considerably reduce the power requirements of the system. Cold cathode tubes are used not only for counting purposes and for storage of indications, but also in various pulse generating and timing circuits so that the majority of the tubes at each field station location are of the cold cathode type.

Described briefly and without any attempt to define it in its exact terms, the invention comprises in one of its forms a plurality of field stations, each connected to a central office over a pair of line wires. During a cycle of operation, each station in its allotted time in the cycle sends a series of pulses comprising the indication information from that station to the central office. A modification of the invention is also disclosed having a single field station, and this station repeatedly transmits its indications to the central office.

In one form of the invention, the transmitted pulses comprise five millisecond intervals during which a distinctive carrier frequency is transmitted followed by a five millisecond rest period in which no carrier is transmitted. Thus each "pulse period" allotted to the transmission of a single code character is ten milliseconds long. Actually, either of two distinctive characters can be transmitted on a "pulse period." For one kind of code character, a particular frequency is transmitted in the manner just described; a different kind of character is transmitted by slightly shifting the frequency of the carrier wave on that pulse period.

The transmission of pulses between the central office and the field stations can be accomplished by keying a carrier transmitter and sending the resulting pulses over a pair of line wires connecting the office with each station. Or, if desired, the codes may be transmitted by space radio in any desired manner such as by frequency modulation, pulse position modulation, or the like.

When the system comprises a number of field stations, each station preferably transmits its code pulses at the same preselected rate. To accomplish this, a stream of timing pulses is transmitted from the central office during a cycle. These pulses are received at each field station and establish, by their repetition rate, the rate at which the indication pulses are transmitted to the central office. Each field station is thus "driven" by these pulses received from the central office. As with the indication code just described, these timing pulses comprise, in one form of the invention, five millisecond intervals on which a distinctive carrier frequency (different from the indication frequency) is transmitted followed by a five millisecond rest period to form a ten millisecond "pulse period."

Also, each station must transmit its indications only during the time period in the cycle allotted to that station. To accomplish this, there is periodically inserted in the stream of timing pulses transmitted from the central office, a distinctive pulse called a station-call pulse. This pulse can be made distinctive from the timing pulses by shifting slightly the frequency of the transmitted carrier. Each field station has means for recognizing the special station-call pulses and counting them to determine when in the cycle it should transmit its indication code. As an example, field station No. 10 becomes gated to transmit its indication code pulses upon having counted ten station-call pulses; its indication pulses are then transmitted at the rate of the timing pulses received in the interval or "station period" lasting from this tenth station-call pulse until the arrival of the eleventh station-call pulse.

To store the indications at the central office, banks of storage units are provided, one for each field station. Each bank includes a number of dual state storage devices, one for each of the ten pulse periods comprising the code for that station. Each of these devices can be operated to one condition or the other dependent upon the kind of code character received on the respective pulse period from the particular station corresponding to that bank. These banks of storage units are selectively gated in turn by a station counter so that the groups of incoming indication pulses, each from a different field station, are in effect, routed to the proper storage bank.

Since the various pulse periods are effectively demarcated at the central office by the means generating the timing pulses transmitted to the field station, it is theoretically necessary to transmit only one kind of code character from a field station since the absence of any transmission on a step could then represent the other kind of code digit on that step. If this were done, it would require that proper synchronization be always maintained to ensure that each locally timed pulse period occurred concurrently with its corresponding received code character. However, in the present system a code character of one kind or the other is transmitted for each digit of an indication code so that it is possible to demarcate the pulse periods according to the code actually received. This arrangement provides more accurate gating of the indication storage devices on the respective pulse periods.

In one embodiment of this invention having a number of field stations, each timing pulse transmitted from the central office comprises five milliseconds of 8 kc. carrier transmission followed by another five milliseconds when nothing is transmitted. A station-call pulse is similar except that the carrier is shifted to 7.75 kc. For transmitting indication, either of two kinds of transmissions are made from a field station to the central office on each pulse period of the code. For example, to indicate that a track switch is in its normal position, the nominal indication frequency such as 15 kc. is transmitted; to indicate that the switch is in its reverse position, the carrier frequency is shifted on that pulse period to a slightly different value such as 14.75 kc. Other frequency values may as well be used.

It is necessary that the counting circuits at each field station of a multiple station system start every cycle in their initial or zero conditions. To do this, the central office ceases to transmit the timing and station-call pulses for a brief interval at the end of each cycle. This period of "silence" is detected at each field station and results in the restoration of all the counting circuits to their zero conditions.

Both station and step counting at the field stations and the central office is accomplished by novel decade counters using a single, cold-cathode, grid-glow tube for each step or count. The indications received at the central office are stored in selectively gated banks of similar cold-cathode, grid-glow tubes. Various other circuit functions are also performed through the use of cold-cathode tubes.

Each field station transmits its indication code only during the interval between a particular pair of successively occurring station-call pulses as selected by its station counting circuits. Yet this indication code must be wholly received at the central office during the station period for that station in order that the code can be routed to the correct storage bank, and this must occur despite any delay produced by filter "inertia," line propagation time, and the like. This is accomplished by causing the station period demarcated at the central office to be somewhat longer than the time required for the transmission of all the indications from any one station. Thus, the interval between successive station-call pulses which is a station period is twelve pulse periods long in the illustrated embodiment of this invention, but only the first ten pulse periods are utilized for the transmission of the indication code. More specifically, the central office counter means, effective to insert the station-call pulses in the cycle periodically, is a scale-of-twelve divider so that a station-call pulse is transmitted on each twelfth pulse period. However, the step counter at each field station used to demarcate the pulse periods has a capacity of only ten counts. Therefore, only ten pulses on the first ten pulse periods of a station period are transmitted from any station and these can readily be received, despite considerable delay in transmission, at the central office before the end of the twelve-pulse-period-long station period.

There is also disclosed a form of this invention comprising only a single field station. When there is only a single field station in the system, it is not necessary to provide means for telling that station when it should transmit its indications to the central office; the single station transmits its series of indication code pulses repeatedly with each such transmission constituting a complete cycle. It is not required in such a system, therefore, that there be any transmission of either timing or station-call pulses from the central office to the field station; the repetition rate for the system is then established by timing means provided at the transmitting field station. As with the multiple station system, however, it is necessary in a single station system to reset the various central office counters at the beginning of each cycle. This is done by not transmitting any indication pulses for a time. The resulting "synch" period is detected at the central office and causes the resetting of all the counters to their zero conditions.

It is thus an object of the present invention to provide a system for the transmission of information from a plurality of field stations to a central office wherein the time allowed for transmission from each field station during a cycle is governed by pulses received from the central office.

Another object of this invention is to provide an electronic code communication system for transmitting information from a field station to a central office which employs improved counting circuit means comprising cold cathode tubes.

Another object of this invention is to provide a code communication system having improved information storage means comprising cold cathode tubes.

Another object is to provide a system having means for accommodating considerable delay in the reception of the indication codes from the various field stations.

An additional object of this invention is to provide a code communication system of the kind wherein various field stations transmit indications in turn to a central office wherein the various counters at each field station are all made inactive with all their cold cathode tubes extinguished when that station has transmitted its indications to the central office and until the beginning of the following cycle to conserve tube life.

Other objects, purposes, and characteristic features of this invention will in part be obvious from the accompanying drawings and in part pointed out as the description of the invention progresses.

In describing this invention in detail, reference will be made to the accompanying drawings in which those parts having similar features and functions are designated throughout the several views by like reference characters, and in which.

Figure 3A:
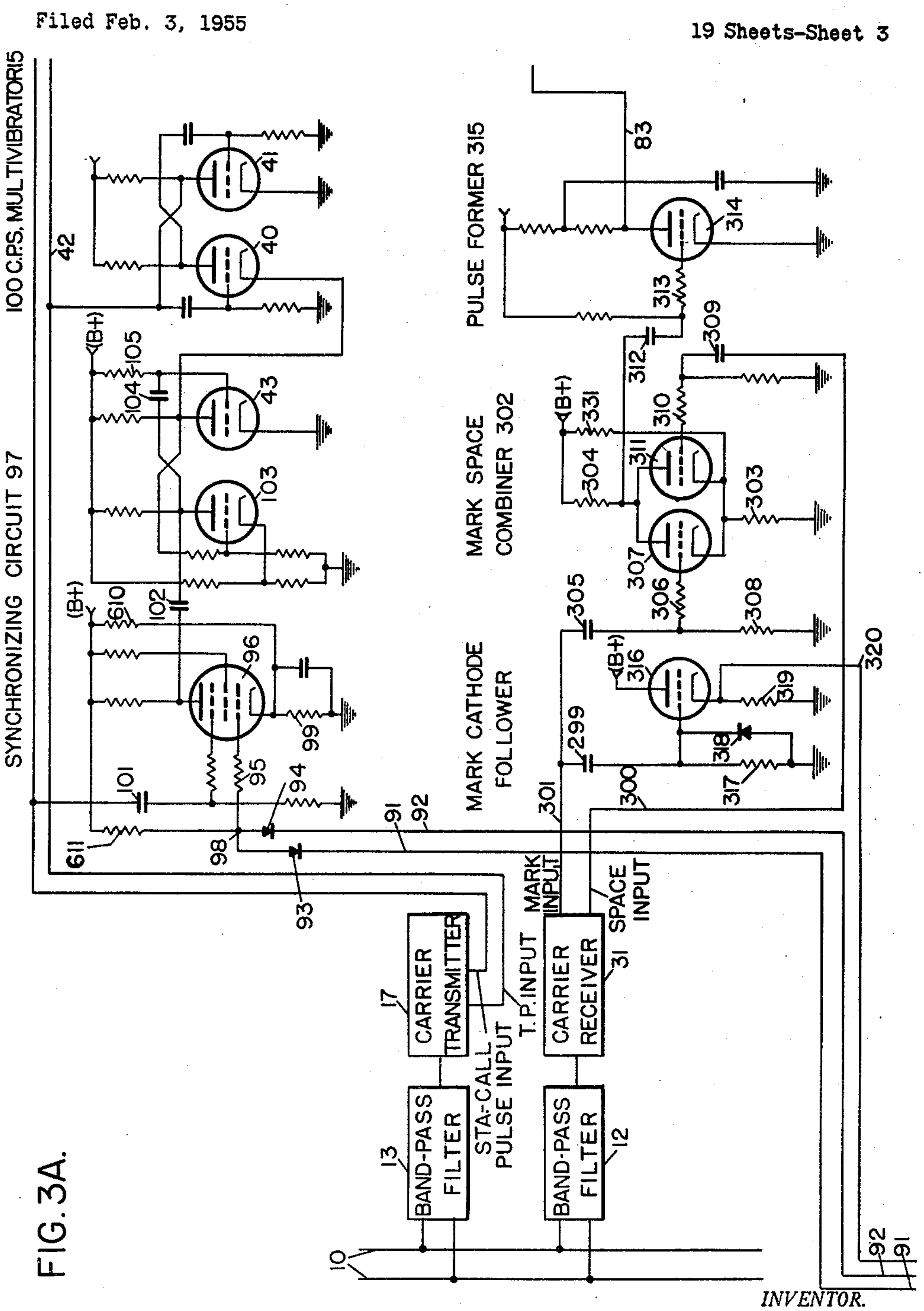
Figure 3B:
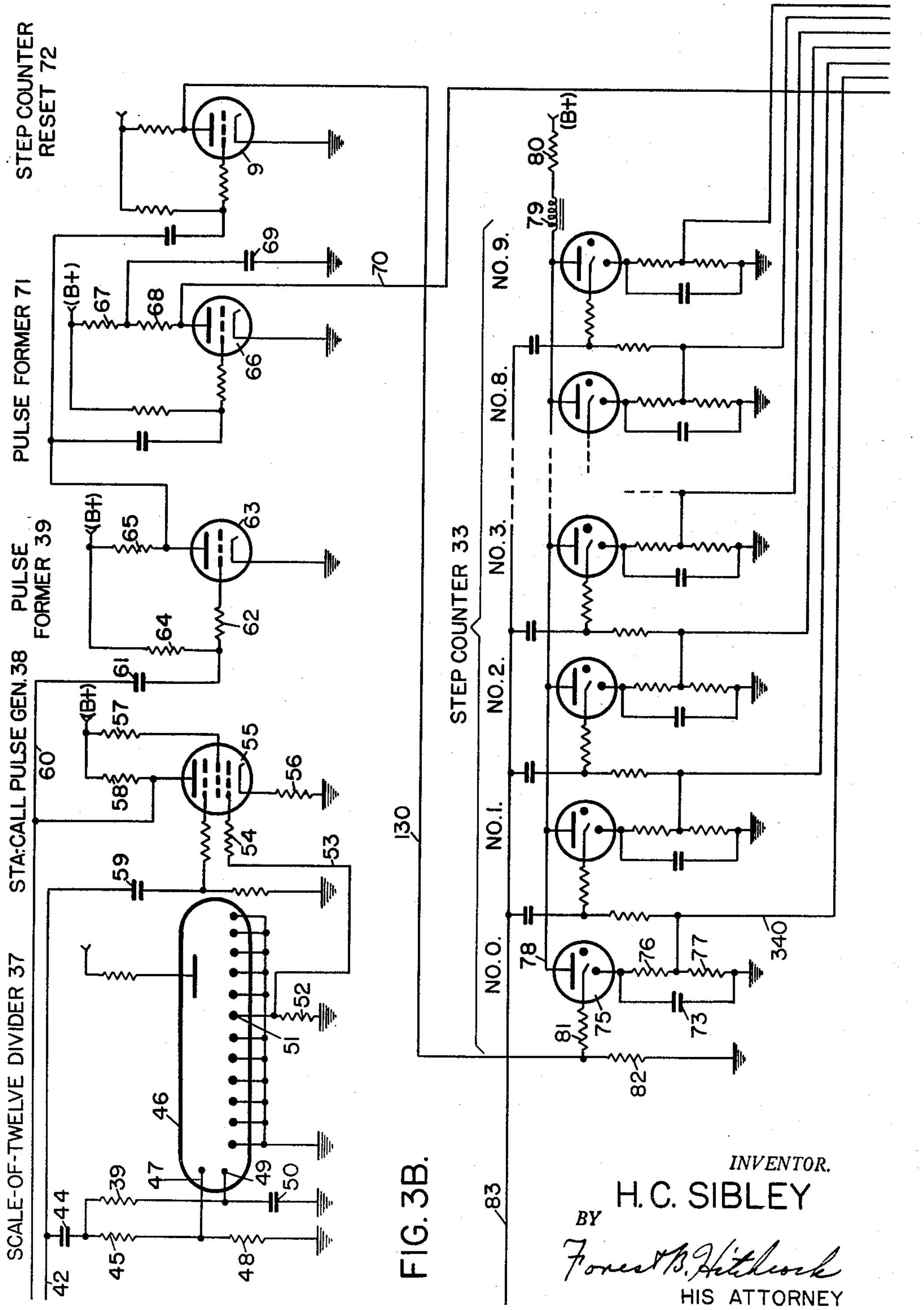
Figure 3C:
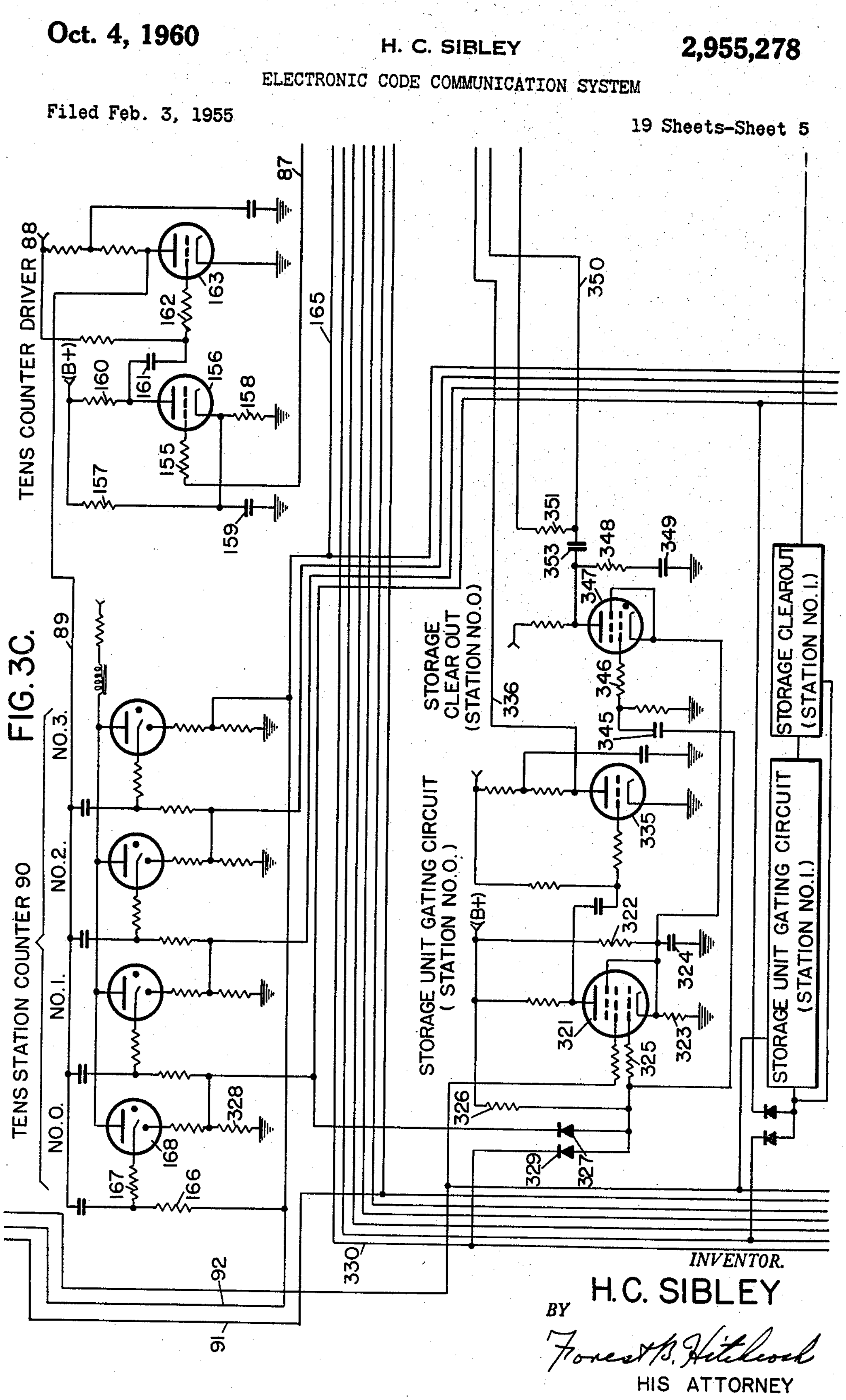
Figure 3D:
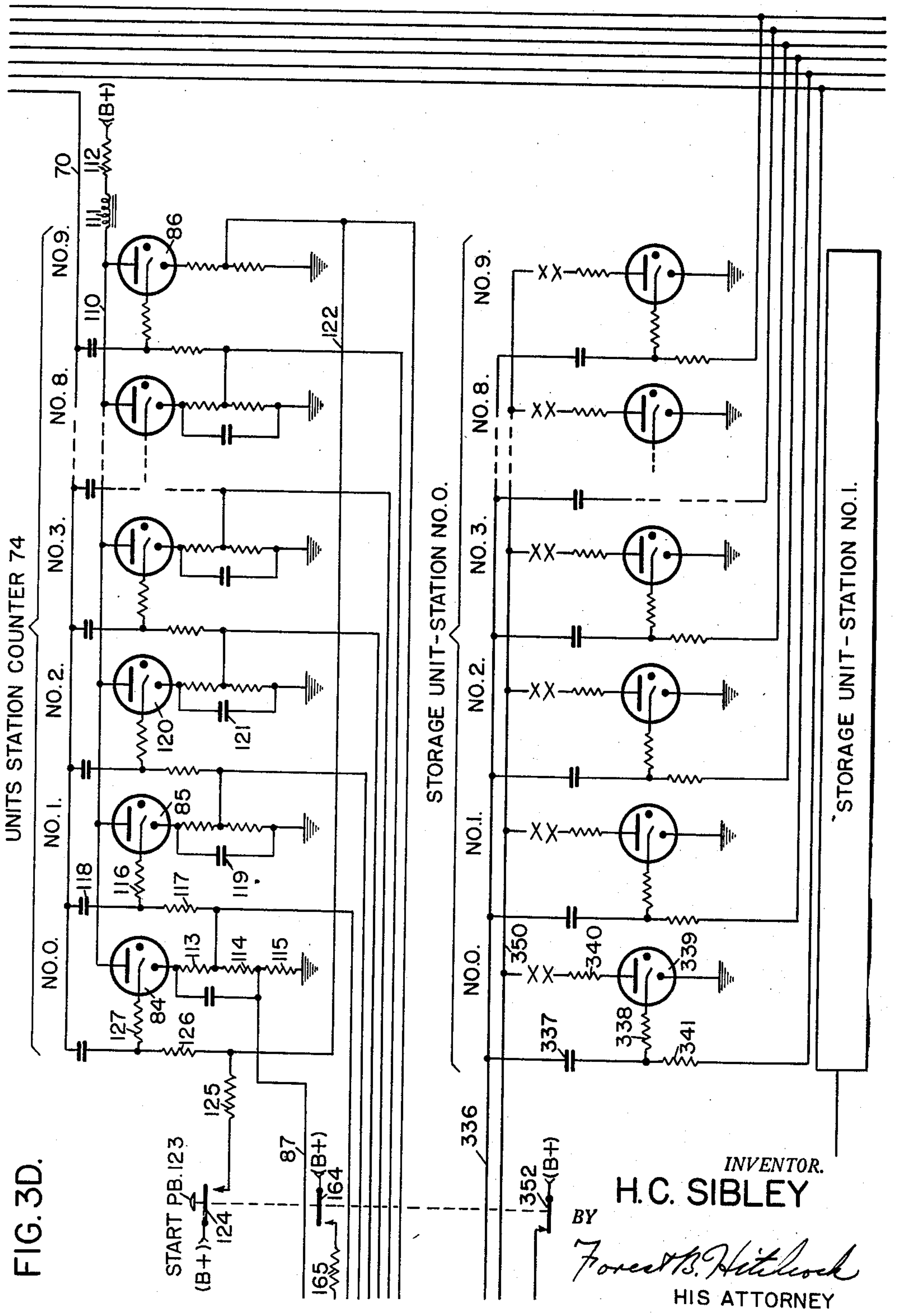
Figure 4A:
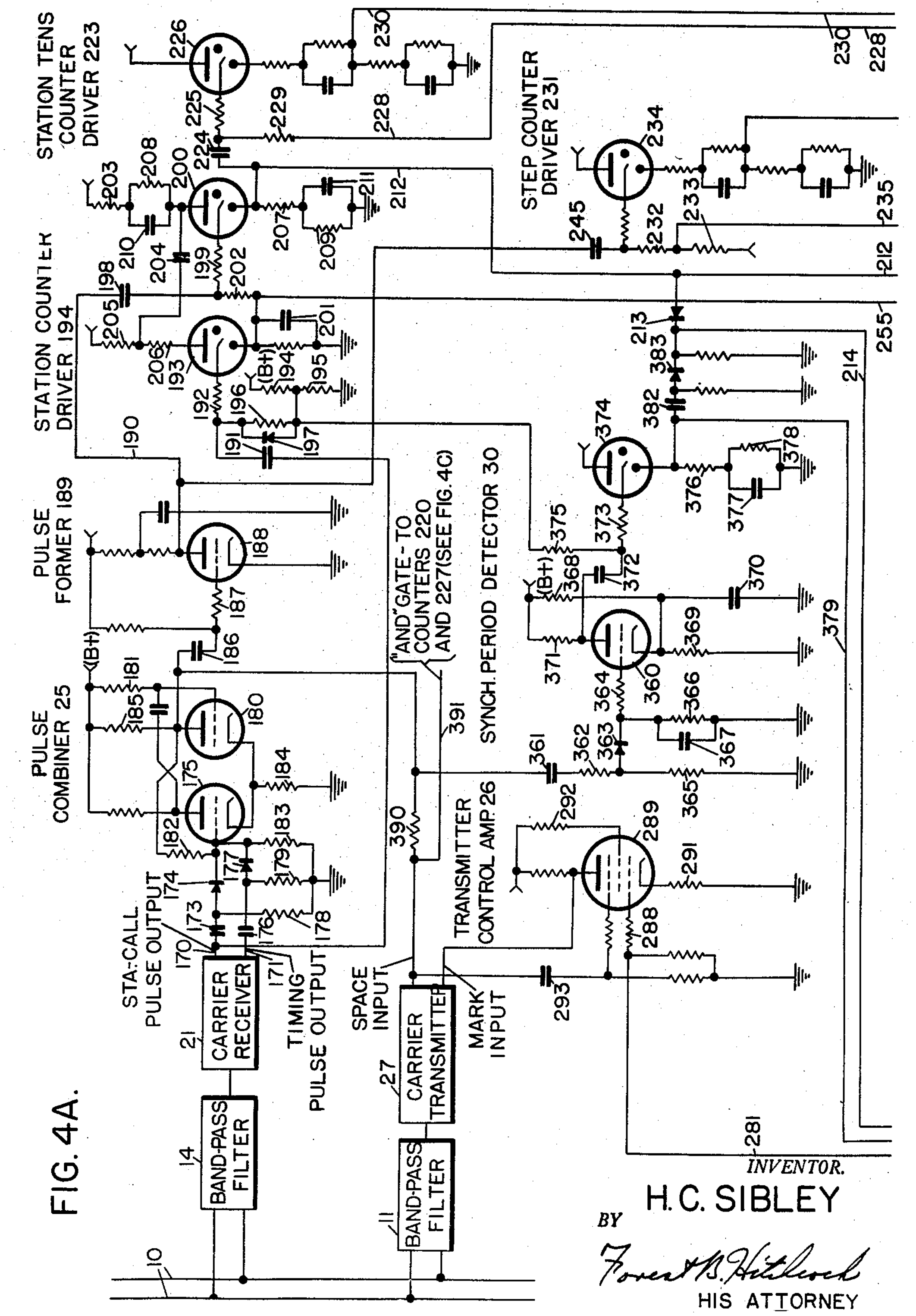
Figure 4B:
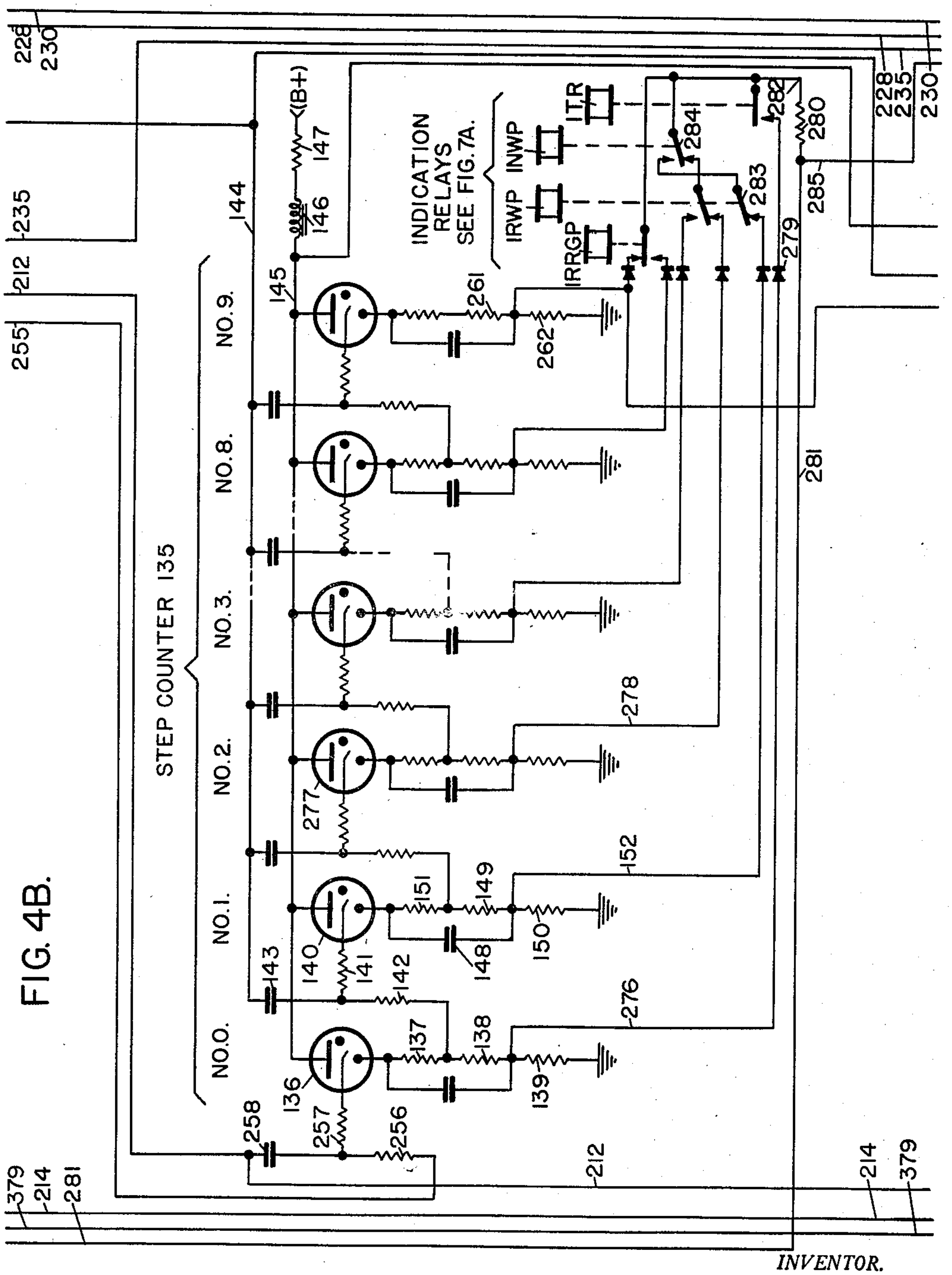
Figure 4C:
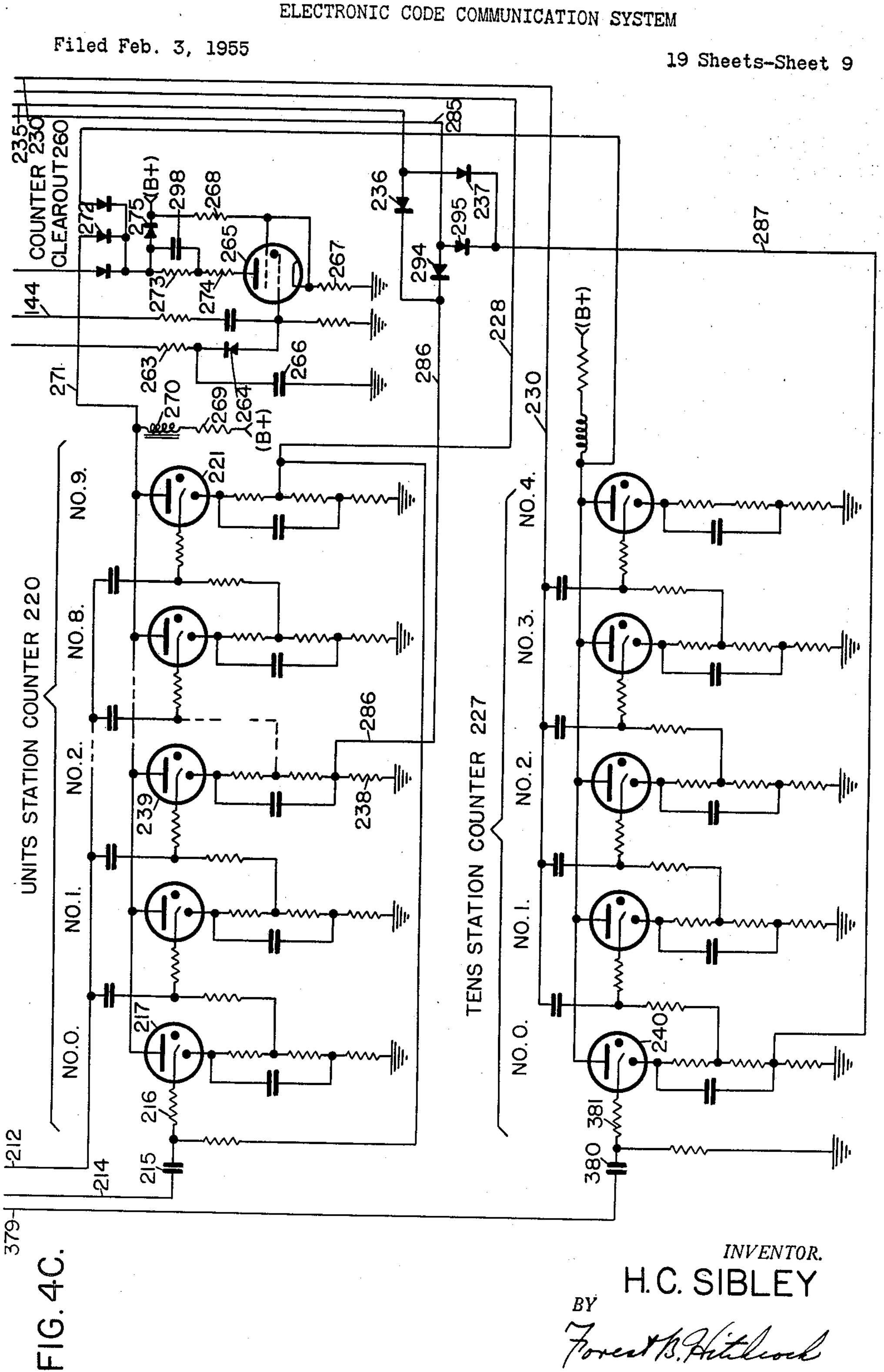

Figs. 3A, 3B, 3C, and 3D, when placed with Fig. 3B to the right of Fig. 3A and Figs. 3C and 3D placed under Figs. 3A and 3B respectively, illustrate the detailed circuit organization for the central office apparatus of a multiple station system;

Figs. 4A, 4B and 4C, placed one above the other, illustrate the detailed circuit organization for a typical field station as used in a multiple station system.

Figures 2, 6A, 6B:
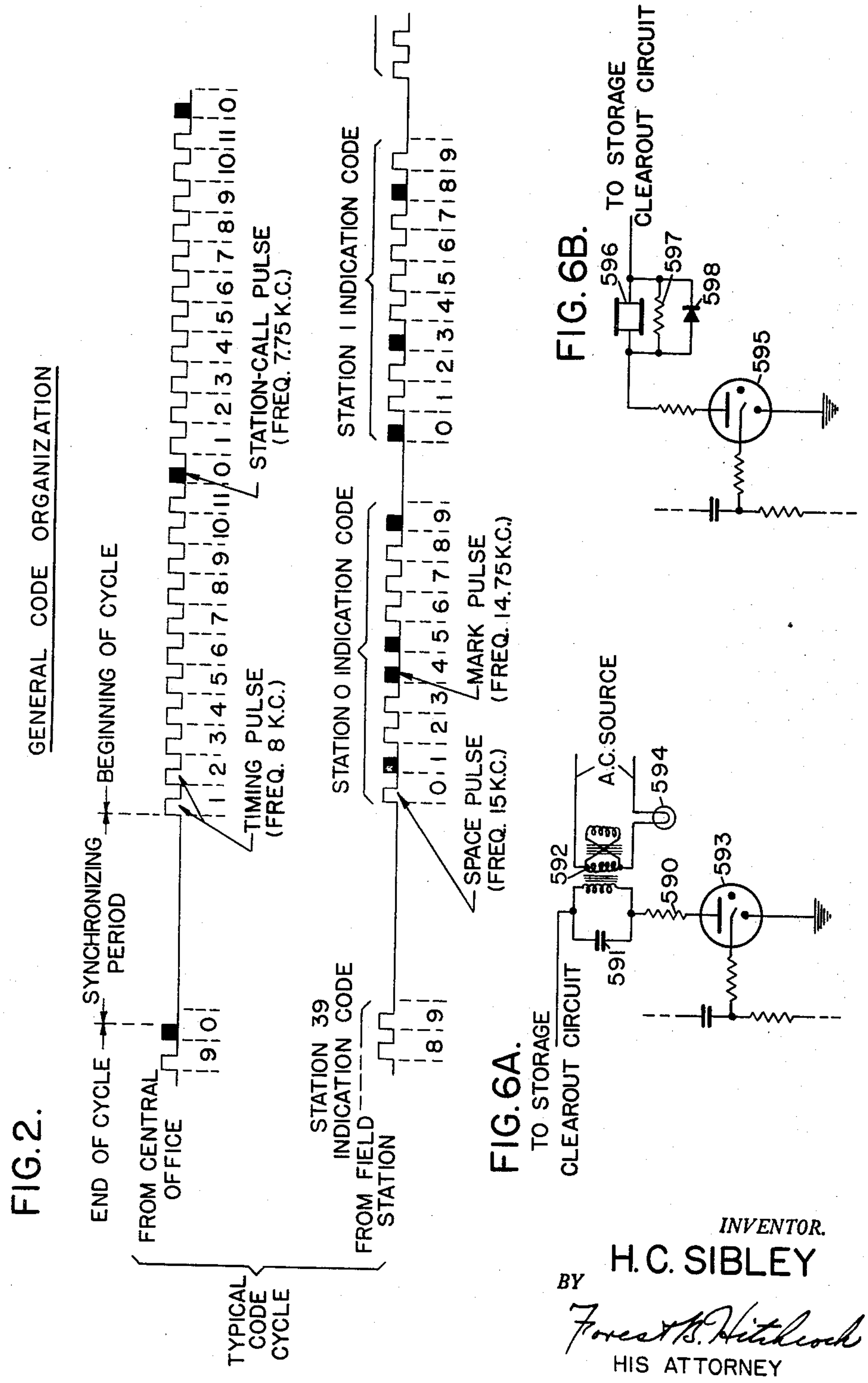
Fig. 2 is a simplified timing chart showing the general code organization of the multiple station system.
Figure 5A:
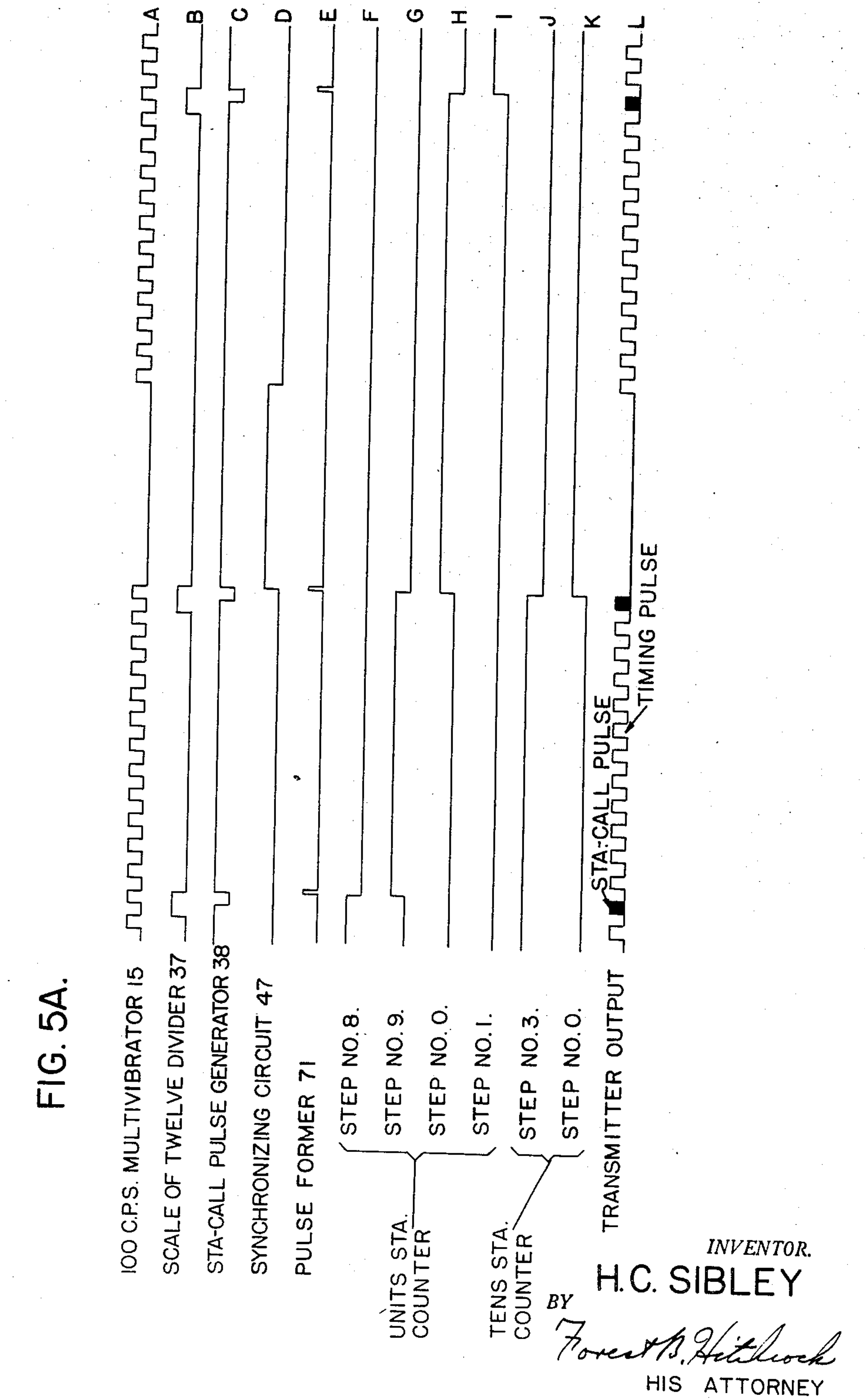
Figure 5B:
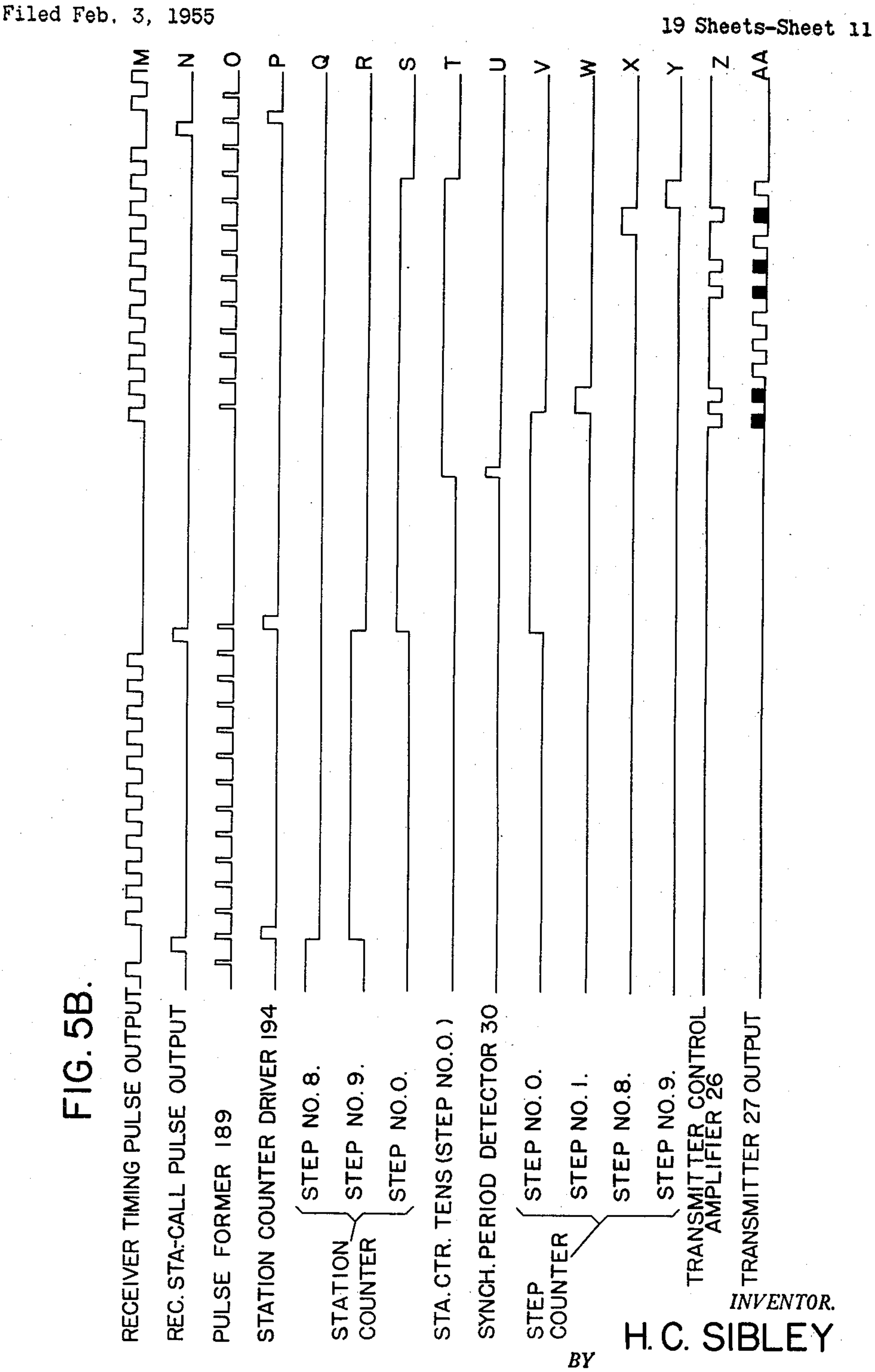
Figure 5C:
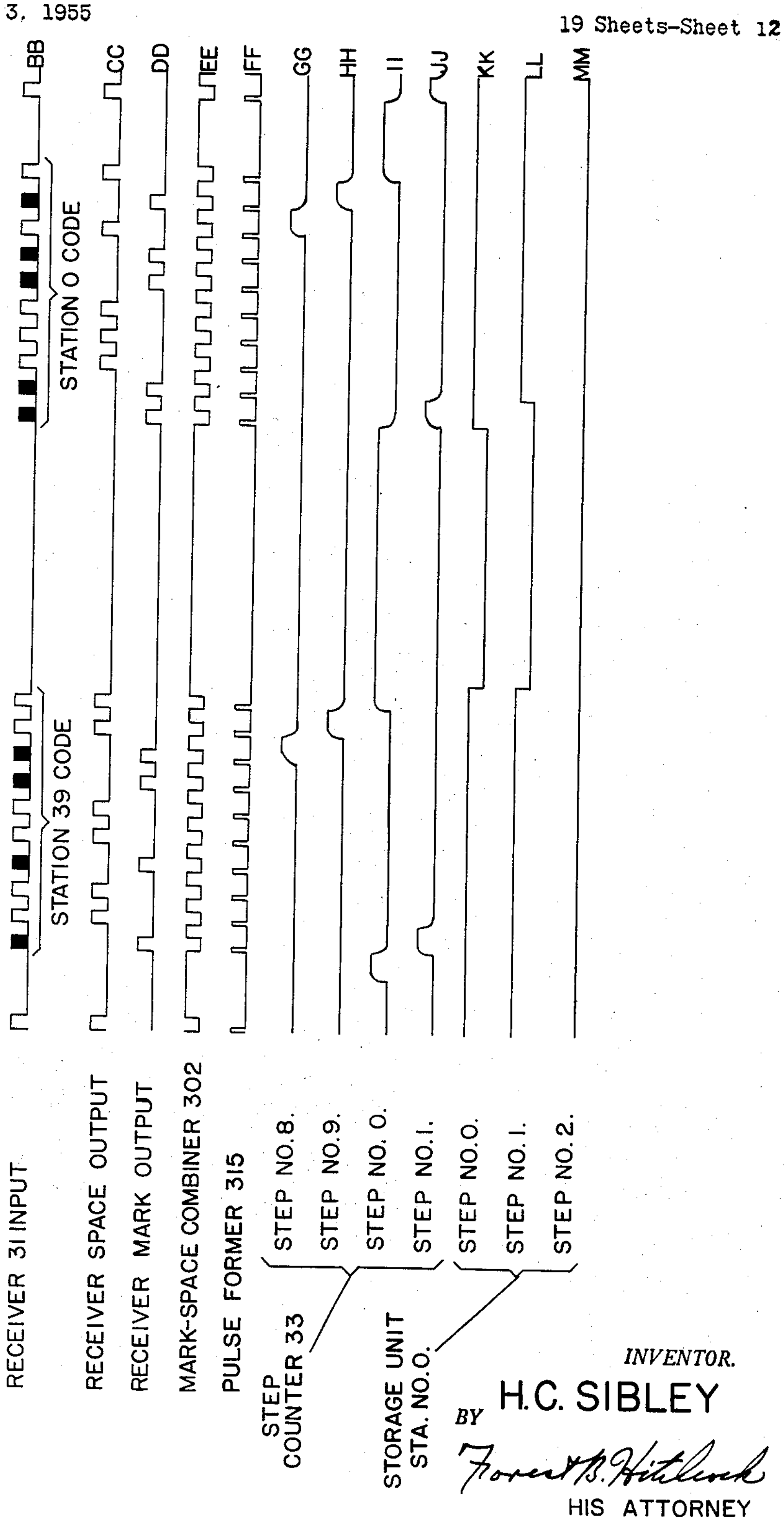
Figures 7A, 7B:
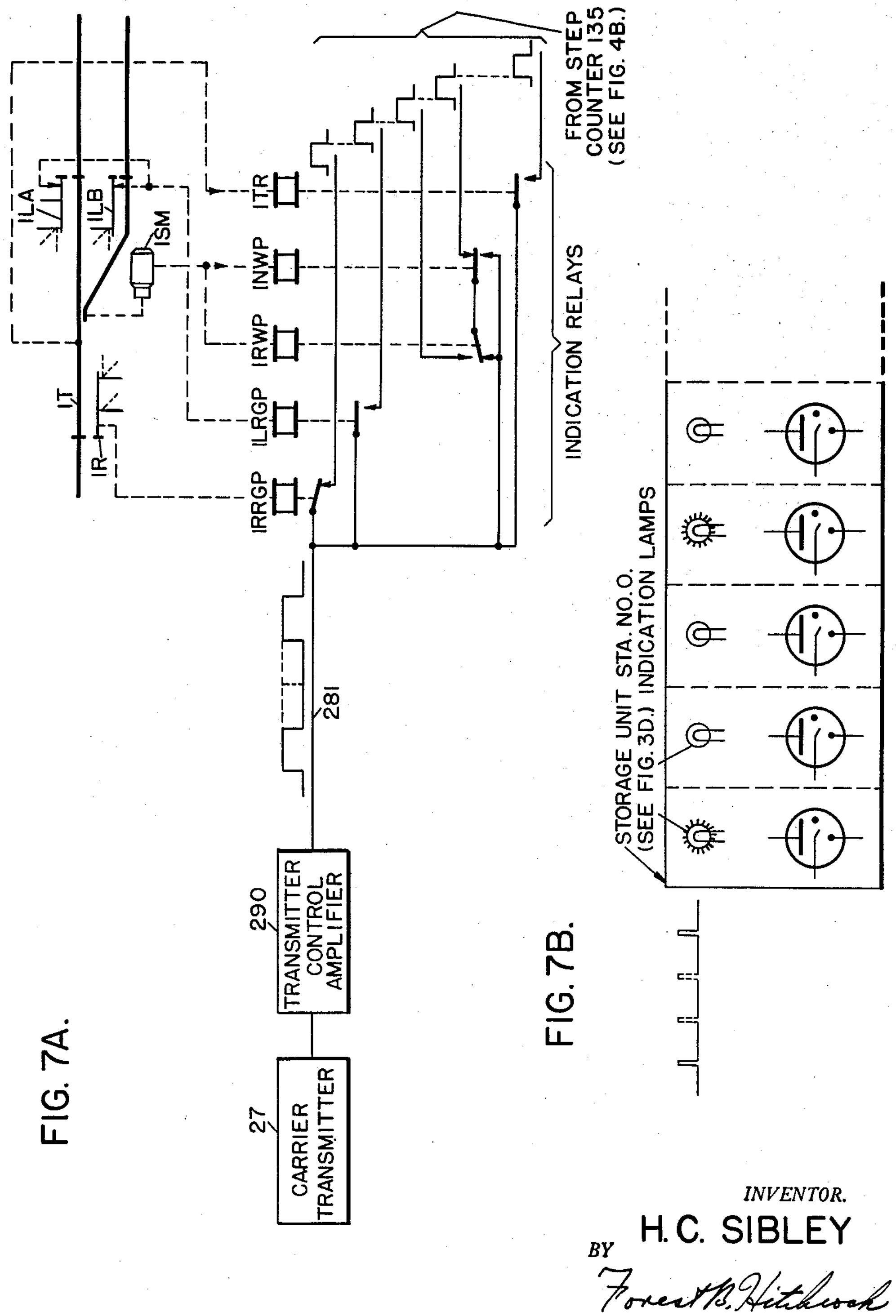
Figure 8A:
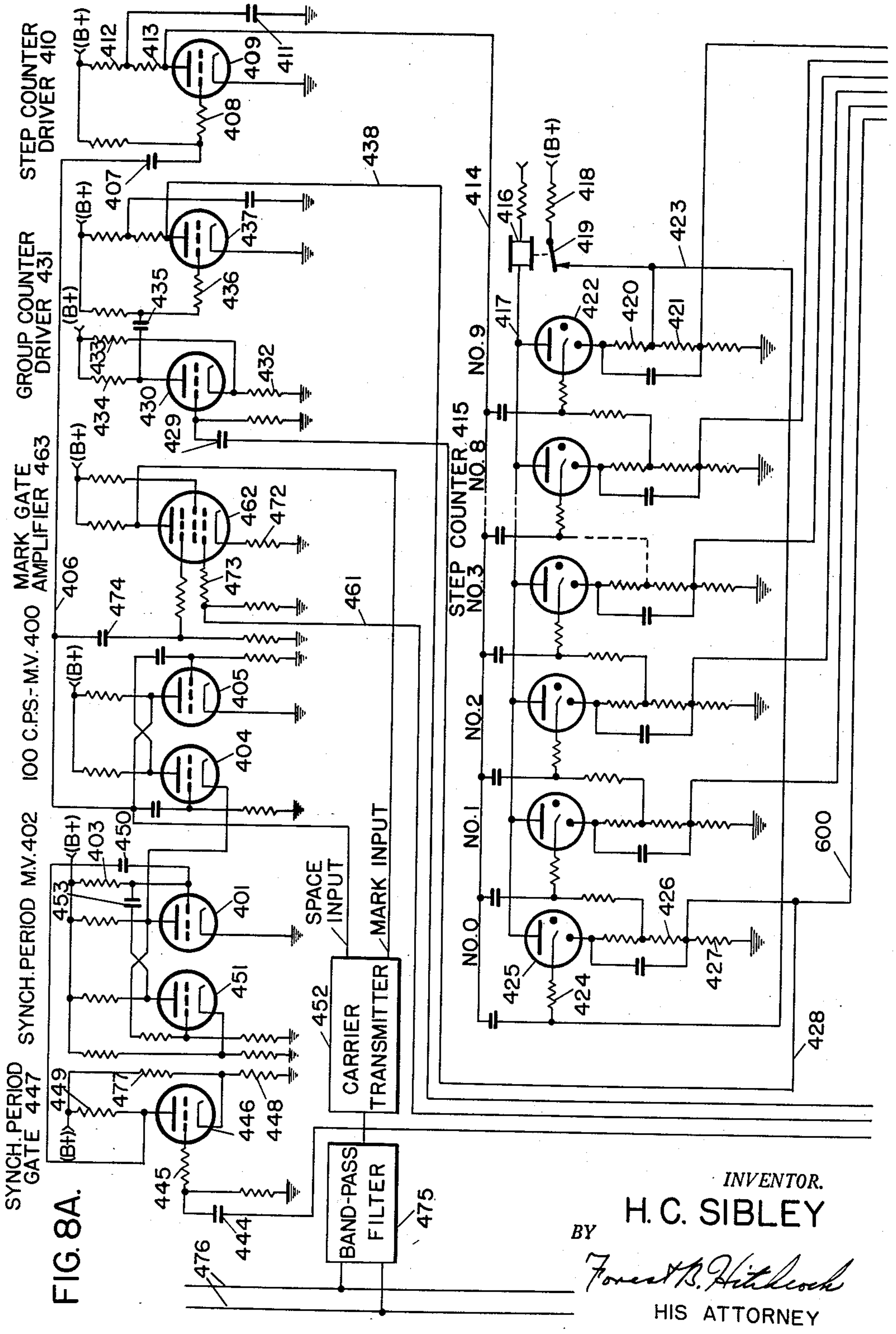
Figure 8B:
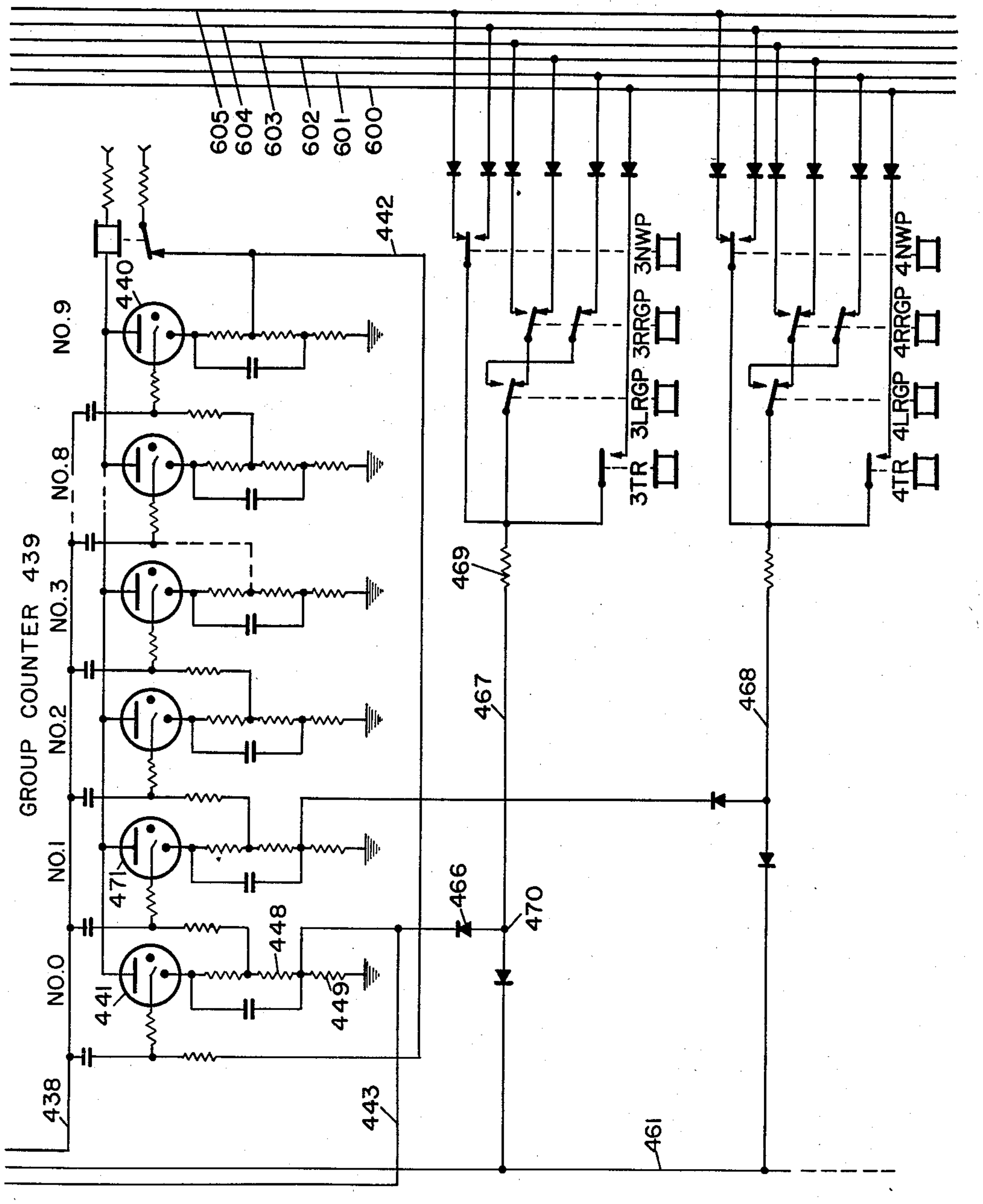
Figure 9A:
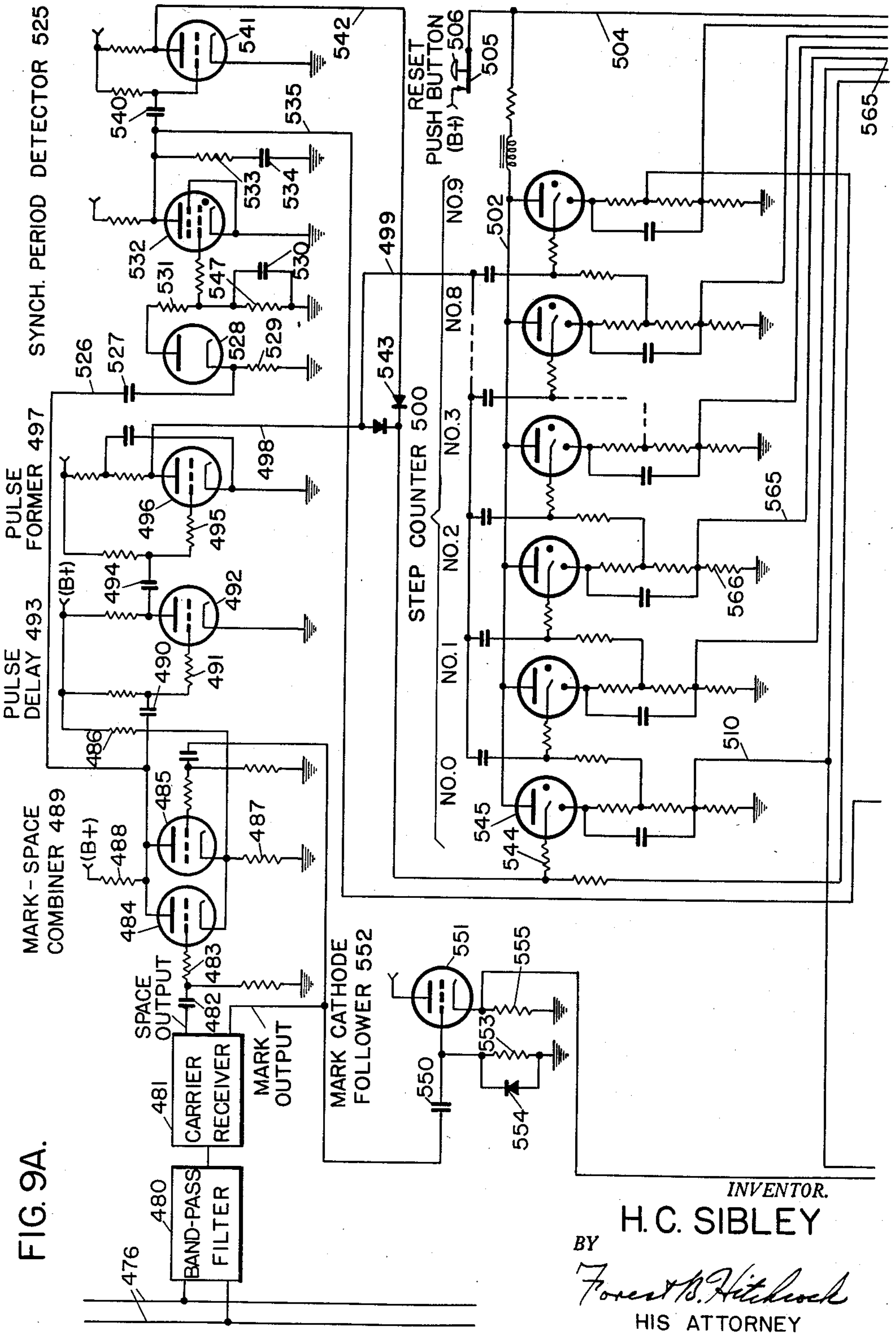
Figure 9B:
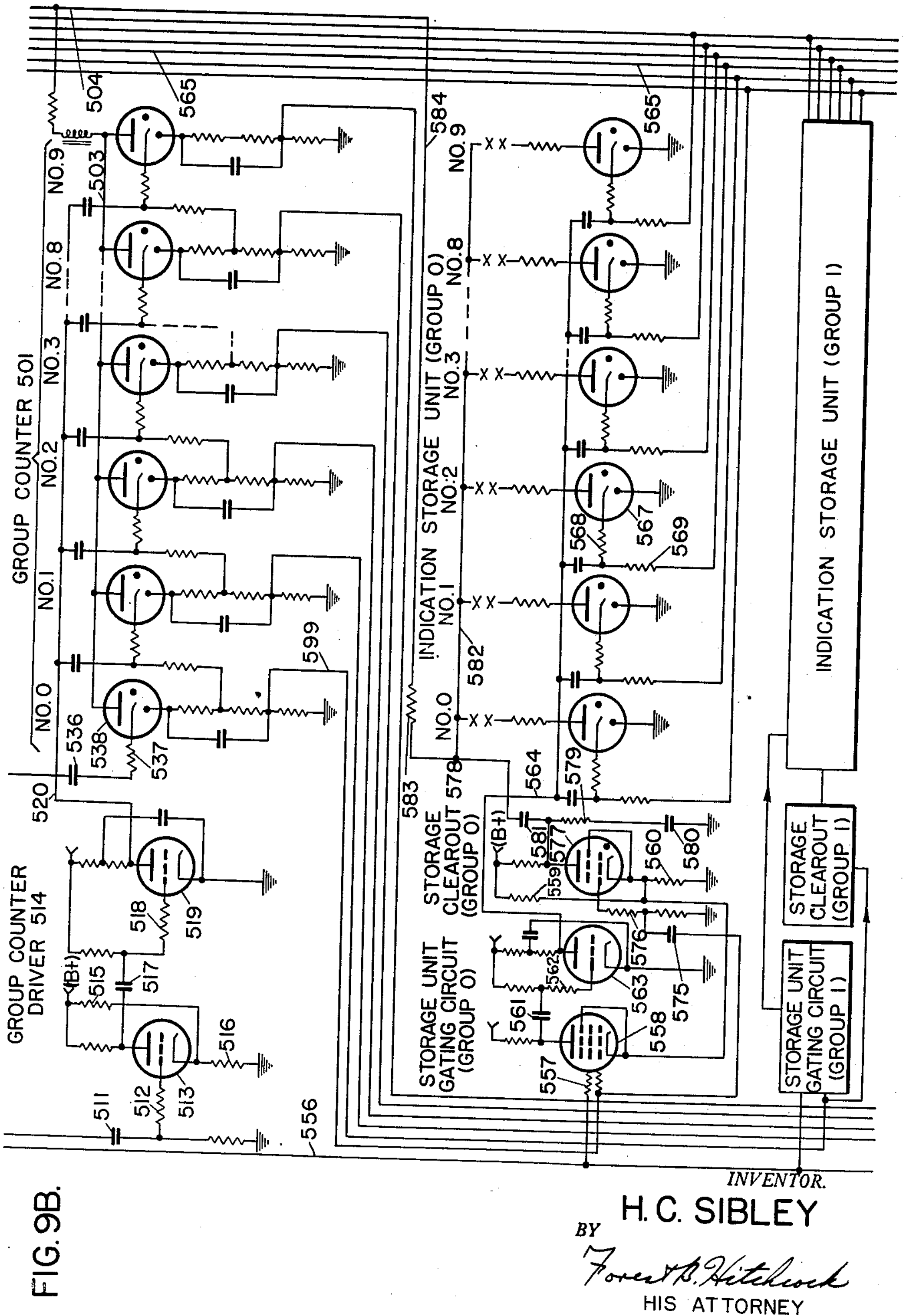
Figure 10A:
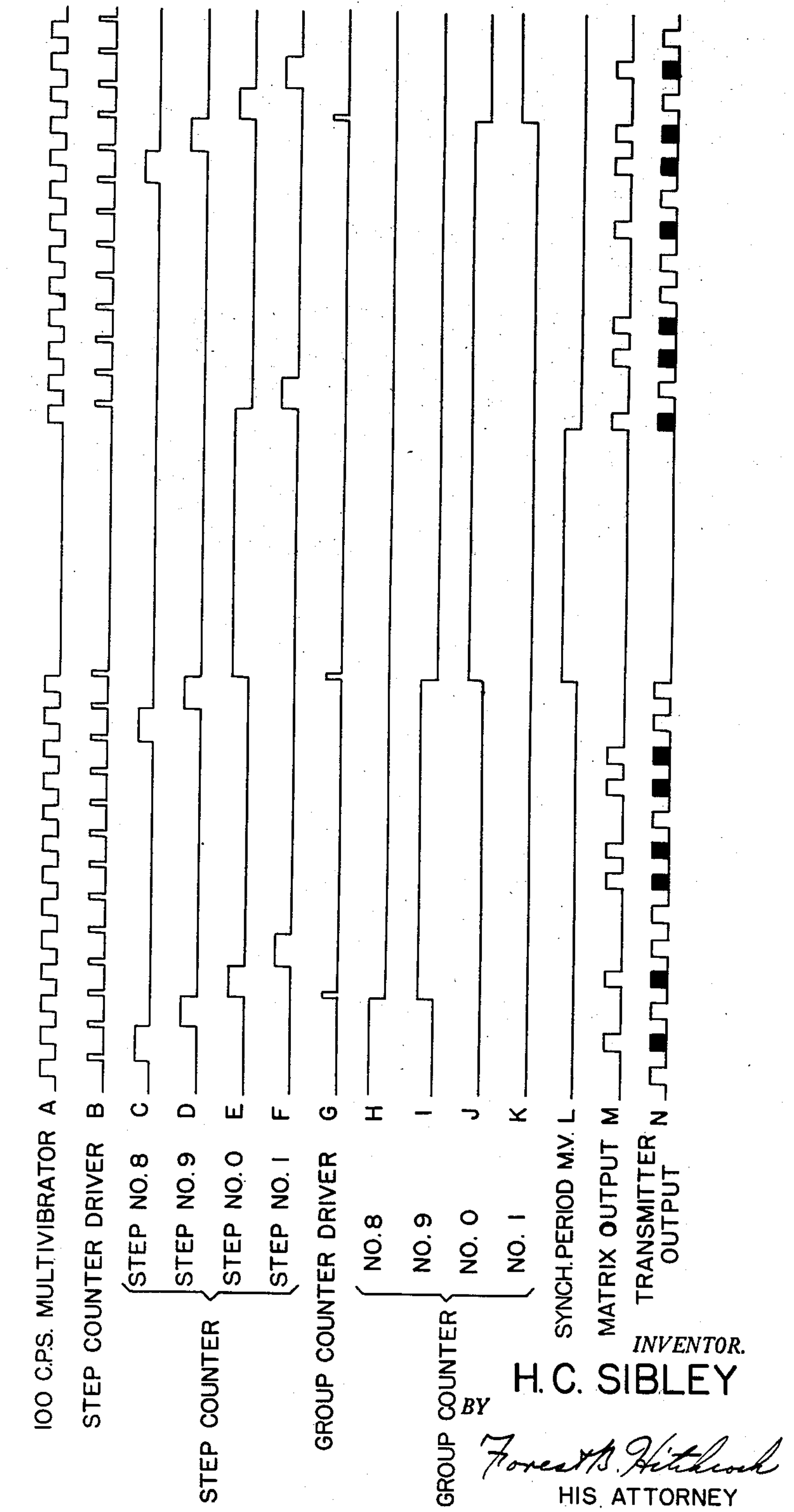
Figure 10B:
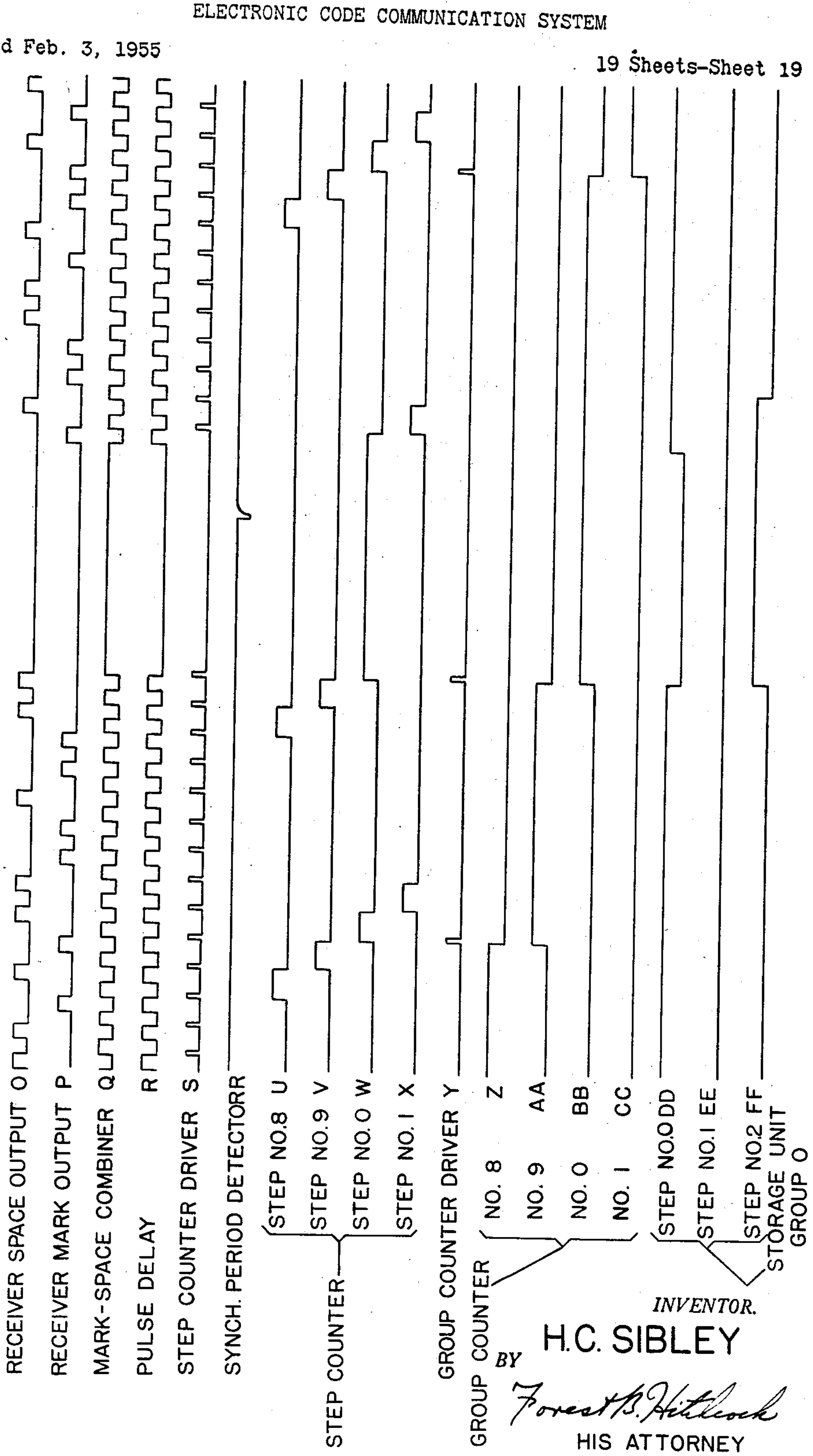

Figs. 5A, 5B, and 5C, placed one above the other, illustrate waveform diagrams relating to the operation of the multiple station system;

Figs. 6A and 6B illustrate the manner in which indication lamps and relays may be respectively controlled by the storage tubes;

Figs. 7A and 7B illustrate how a stored indication code may be visually displayed to give information regarding the conditions of devices at the field stations;

Figs. 8A and 8B, placed one above the other, illustrate the detailed circuit organization of the central office apparatus of a single station system;

Figs. 9A and 9B, placed one above the other, illustrate the detailed circuit organization of a typical field station in a single station system; and Figs. 10A and 10B, placed one above the other, illustrate waveform diagrams relating to the operation of the single station system.

To simplify the illustrations and facilitate the explanation of this invention, the various parts and circuits have been shown diagrammatically, and certain conventional illustrations are employed. The drawings have been made to make it easy to understand the principles and manner of operation of this invention rather than to illustrate the specific construction and arrangement of parts that would be used in practice. The various tubes and their elements and all other circuit components have been shown in conventional form. The various relays and their contacts have also been illustrated conventionally instead of showing all of their details. Sources of electrical energy have also been represented by conventional symbols. Thus, the symbols (B+) and the symbol for a ground connection represent conditions to the opposite terminals of a source of energy suitable for the control of electron tubes and associated apparatus. The symbols (+) and (−) associated with appropriate arrowheads and tails respectively represent the positive and negative terminals of a source of energy of relatively low voltage such as is suitable for the control of electromagnetic relays and the like.

GENERAL ORGANIZATION

The general features of the electronic code communication system of this invention are useful in a variety of different applications where it is necessary to transmit information rapidly from a number of remote field station locations to a central office. However, to demonstrate most clearly and specifically the utility of the present invention, the particular embodiments disclosed here illustrate the use of this system as applied to the transfer of information regarding the operated conditions of switches, signals and other devices of a section of railroad as well as track occupancy conditions to a central office where these indications may be displayed. The description to be given here relates particularly to the multiple station system; the single station system will be described separately later.

Figure 1:
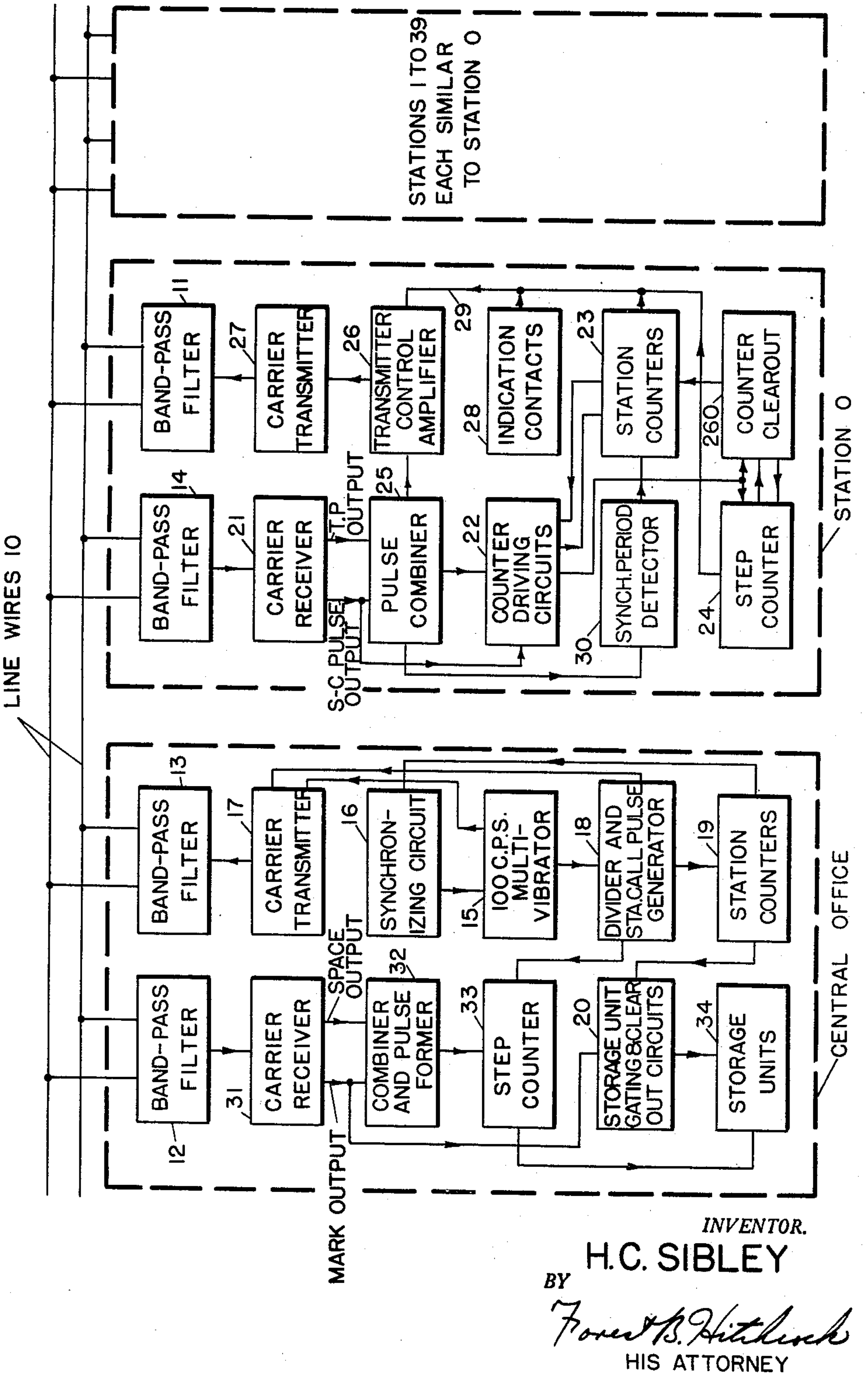
Fig. 1 is a block diagram illustrating the general organization of the multiple station system of the present invention.

The general system organization of the multiple station system of the present invention is shown in block diagram in Fig. 1 without attempting to show in block form all the various circuit organizations shown in the detailed circuit drawings. This drawing shows a pair of line wires 10 that extend between a central office and each of a number of field stations. Since all of the field stations are similar, only one typical field station has been shown in block form in this diagram.

All the field stations transmit their indications to the central office over the line wires 10. These indications are in the form of pulses of carrier frequency. On each pulse period of the indication code, either of two distinctive characters is transmitted. A short interval of carrier transmission at the nominal indication frequency such as 15 kc. constitutes one type of code character; shifting the carrier frequency to a slightly different value such as 14.75 kc. as the code pulse is transmitted forms a different character that is recognized as such at the central office. Both these frequencies, i.e. 15 and 14.75 kc. are readily passed by the band-pass filter 11 provided at each field station and the band-pass filter 12 at the central office.

Each timing pulse transmitted from the central office to each field station over line wires 10 constitutes an interval of carrier transmission at the nominal frequency of 8 kc. Each distinctive station-call pulse is formed by shifting the frequency a slight amount to 7.75 kc. Both of these frequencies are readily passed by the band-pass filters 13 and 14 located at the central office and field stations respectively.

The central office comprises a 100 c.p.s. free-running multivibrator 15 that is effective throughout a cycle to generate the desired timing pulses at the predetermined repetition rate for the system. This multivibrator thus acts as the "clock" for the system, and its output provides a square wave of output voltage having a period of ten milliseconds. The multivibrator operates continuously throughout a cycle except during the synchronizing period as will be described.

The output of the multvibrator 15 is applied to the carrier transmitter 17 and is effective to key the transmitter on and off as the multivibrator output voltage alternates between its high and low levels respectively. As a result, carrier pulses, each of five millisecond duration, appear successively on the line wires 10 with successive pulses separated by five millisecond intervals during which no carrier is transmitted.

The output of the 100 c.p.s. multivibrator 15 is also applied to the divider and station-call pulse generator 18. This circuit organization is essentially a counting circuit associated with a gated pulse former. It counts the timing pulses received from the 100 c.p.s. multivibrator 15 and for every twelfth such pulse counted applies a distinctive output to the carrier transmitter 17. Consequently, the output of the carrier transmitter 17 is shifted in frequency slightly for a five millisecond pulse period. The code transmitted from the central office thus appears as shown on the upper line of Fig. 2. The code comprises series of timing pulses but with each twelfth pulse being shifted slightly in frequency from its nominal value to make it a distinctive station-call pulse.

The interval from one station-call pulse to the next demarcates a station period for a particular station in the system, and it is during this interval that the selected station is allowed to transmit its indications to the central office. To demarcate these different station periods, station counters 19 are provided at the central office, and these counters are driven by the station-call pulse source 18. As will be shown, the station counters 19 comprise two decade counters, one for counting units and the other for counting tens. Each station-call pulse produces an advance of a single count on the units counter. Each time the units counter has counted its capacity of counts, it is restored to its zero condition and an input is applied then to the tens counter to advance its count by one. Thus, these two decade counters together assume a different condition for each station-call pulse and thereby are effective, as will be described, to gate on each station period a different bank of storage devices. This is accomplished by providing a control from the station counter 19 to the storage unit gating and clear out circuits 20.

At the end of a cycle, as determined by the conditions of the station counters 19 at such time, the synchronizing circuit 16 is made effective to stop the operation of the 100 c.p.s. multivibrator 15 for a short time. With the master timing means of the system temporarily made inoperative in this way, pulses cannot be transmitted from the central office. This forms the desired period of "silence" which is used to synchronize the system.

The timing pulses and station-call pulses received at each field station are passed by the band-pass filter 14 to the carrier receiver 21. This receiver 21 is adapted to provide separate outputs for each timing pulse and station-call pulse.

Each output pulse of the carrier receiver corresponding to a station-call pulse is applied to the counter driving circuits 22. In this way, each station-call pulse is effective through the counter driving circuits 22 to add a count to the station counters 23 and is also effective to reset the step counter 24 to its initial or zero condition so that it will be in the proper condition for counting the pulse periods of the appropriate station period.

Both outputs from the receiver 21 are supplied to the pulse combiner 25 so that an output pulse is obtained therefrom and applied to the counter driving circuits 22 for each timing pulse and station-call pulse received. The pulse combiner supplies an output to the transmitter control amplifier 26 which controls the operation of the carrier transmitter 27. For each pulse supplied by the pulse combiner 25 to the transmitter control amplifier 26, the carrier transmitter 27 is effective to transmit a space pulse provided that no input is at that time being applied to the transmitter control amplifier 26 over wire 29 from the indication contacts 28 and station counter 23. If, however, an input does appear over the line 29 concurrently with the output pulse from the pulse combiner 25, the transmitter control amplifier 26 is then effective on transmitter 27 to transmit a mark pulse through band-pass filter 11 to line wires 10.

The output of the counter driving circuits 22 as controlled by the pulses received from the pulse combiner 25 is effective to operate the step counter 24 which then demarcates the various pulse periods of the station period for that station. The counter driving circuits 22 are gated by the station counters 23 so that the step counter 24 is driven only on the station period for that station.

The output pulses of the pulse combiner 25 are also applied to the synch period detector 30. All throughout a cycle, the reception of either timing or station-call pulses causes pulses to be continuously applied to the synch period detector 30. At the end of a cycle, however, such pulses are for a time not received. The synch period detector 30 detects this condition and produces an output pulse in response to it which is effective to reset the station counter 23 so that it can start the new cycle from its zero condition.

As the step counter 24 operates through its various steps it causes energy to be applied through the various indication contacts 28 to the transmitter control amplifier 26. The station counter 23 provides a gating function so that these pulses can be selectively applied through the indication contacts 28 only on the proper station period of the cycle relating to that station. When such pulses are selectively applied to the transmitter control amplifier 26 they cause the carrier transmitter 27 to transmit a mark pulse rather than a space pulse by shifting slightly the output frequency of the transmitter. In this way, a series of output pulses consisting selectively of marks or spaces as determined by the conditions of the indication contacts 28 is transmitted through band-pass filter 11, and over line wires 10, to the central office.

The counter clearout 260 is effective, immediately after a station has transmitted its indications, to operate any conductive counting tubes to nonconductive conditions. This counter clearout is conditioned by the step counter 24 when it has operated to its No. 9 step, to respond to the next pulse received from the counter driving circuits 22. When it receives such next pulse, the counter clearout acts on both the step counter 24 and station counters 23 to extinguish whichever tube of these counters is then conductive.

A typical indication code such as may be received at the central office is diagrammatically illustrated in the lower line of Fig. 2. The pulses of carrier frequency are applied through band-pass filter 12 to the carrier receiver 31 which is similar to the receiver 21 at each field station. Separate outputs from the receiver supply pulses corresponding to the occurrences of marks and spaces in the indication code. The mark and space outputs are combined by the combiner and pulse former 32, and the resulting pulses are applied to the step counter 33, causing this counter to advance one step for each such pulse.

The storage units 34 provide different banks of storage devices for each station. Associated with each bank of such storage devices is a corresponding storage unit gating and clear out circuit, one for each bank of storage units, and these are selectively gated throughout a cycle by the station counter 19. Consequently, the mark pulses received from the carrier receiver 31 are in this way routed to the proper bank of storage devices. The various storage devices in each bank are selectively gated on the various steps of the received indication code by the step counter 33. On each pulse period as a storage device of that bank is gated, it can be energized only if a mark pulse is received on that step. If a space pulse is received, the device is not energized.

The storage unit gating and clear out circuit associated with each bank of storage devices is also effective just prior to routing a new indication code to a bank of storage devices to clear all previously received indications from such bank of storage devices. Thus, the storage devices in any bank can be selectively energized again in accordance with the marks received in the indication code.

In this way, the received indications are stored at the central office in storage units which may be effective to provide a visual display of indications or may be effective to energize electromagnetic relays for any desired purpose.

*Control office pulse generating circuits*

In describing the detailed circuits of the multiple station indication system of this invention, reference will be made to Figs. 3A–3D which showed the detailed circuits of one embodiment of the invention and to Figs. 5A–5C which illustrate various voltage wave forms appearing in the system. Reference will also be made to Figs. 4A–4C which illustrate the circuit organization at a typical field station of the multiple station system. With respect to the wave form diagrams of Figs. 5A–5C, the various voltage wave forms shown have been illustrated to facilitate an understanding of the operation of the system rather than to show the exact form of the voltage variation in each case. For example, various gating voltages are shown as being rectangular in shape with vertical leading and trailing edges. In actual practice, these voltages necessarily have sloping leading and trailing edges, but this has been shown only where required to obtain a clear picture of the operation of the system.

The basic repetition rate of the system is established by the 100 c.p.s. multivibrator 15 shown in Fig. 3A. This is a free-running multivibrator comprising the two triode tubes 40 and 41 which are interconnected in such a way that they successively alternate between conductive and nonconductive conditions at a rate of 100 times per second. Multivibrators of this kind are well-known in the art so that it is deemed unnecessary to describe in detail the circuit organization and manner of operation of this multivibrator. It is believed necessary to mention only that one or the other of the tubes 40 and 41 is always conductive and while in this condition is effective to maintain the other tube nonconductive. This condition abruptly reverses itself after a predetermined interval to cause the nonconductive tube to become conductive and vice versa. This operation occurs at the 100 c.p.s. rate which means that each tube remains conductive for five milliseconds and then becomes nonconductive for another five milliseconds before again being restored to its conductive condition.

When either tube 40 or 41 is conductive, the flow of plate current through its plate load resistor causes its voltage to be reduced to a fairly low value. However, when such tube is nonconductive, there is then no plate current flowing through its plate load resistor and its voltage rises substantially to the level of the (B+) voltage source. Consequently, the voltage appearing at the plate of tube 41 and applied to wire 42 has approximately the wave form shown at line A of Fig. 5A.

The multivibrator just described is symmetrical with respect to its opposite halves with the exception that the cathode of the tube 40 is connected to the plate of tube 43 rather than directly to ground as is the cathode of tube 41. Throughout a cycle of operation, tube 43 is conductive as will subsequently be described and thereby provides a very low impedance path from its plate to its grounded cathode. In effect, therefore, there is only negligible dissymmetry between the two halves of the multivibrator as long as tube 43 is in a conductive condition.

The output of the 100 c.p.s. multivibrator is applied through a coupling capacitor 44 and a resistor 45 to a guide electrode of tube 46 which is a twelve-cathode, cold cathode glow tube. The general structural organization of the multicathode tube 46 and also its general manner of operation are described in an article appearing in the November 1953 issue of the magazine "Electronics." This article, entitled "Polycathode Counter Tube Applications," describes in detail the manner in which the glow between the plate and any cathode is transferred from cathode to cathode in response to the application of input pulses to the tube.

The input pulses on wire 42 appear with substantially no delay on the guide electrode 47. Thus, each time the output voltage of tube 41 of the 100 c.p.s. multivibrator abruptly drops in value, a negative-going voltage pulse appears immediately at the junction of resistors 45 and 48. The duration of this pulse is dependent on the time required for capacitor 44 to discharge. The discharging of capacitor 44 with a negative voltage cannot produce an immediate voltage decrease at the other guide electrode 49 because of the effect of capacitor 50 which must first charge negatively at an exponential rate before the voltage at the guide electrode 49 can be decreased below ground level. There is thus a slight time delay in the appearance of negative-going pulses at the guide electrodes 47 and 49 as required to produce a transfer of the glow from one cathode to the other in the manner described in the reference article mentioned above.

In response to these negative-going pulses occurring on the guide electrodes of tube 46, the glow may be transferred from any cathode to an adjacent cathode. Each positive-going voltage variation occurring at this plate of tube 41 of the 100 c.p.s. multivibrator 15 produces positive-going pulses at the guide electrodes 47 and 49, but these are not effective to cause a transfer of the glow from one cathode to another. These cathodes are all arranged in a circular pattern about the anode of the tube so that the cathode appearing at one end is actually adjacent the cathode at the opposite end. Consequently, as pulses are applied successively to wire 42 and thus to the guide electrodes of this tube, the anode-cathode glow continuously transfers from one cathode to the next in a repeating circular pattern.

When the glow is on a particular cathode of tube 46, there is a flow of current from the plate of the tube to that particular cathode. Consequently, each time the glow reaches the cathode 51, there is a voltage drop produced across cathode resistor 52 so that the voltage appearing on wire 53 is suddenly raised from its normal ground level throughout the time that the glow appears on cathode 51. When the next negative-going voltage pulse appears on wire 42 and causes the glow to transfer to the next cathode, the voltage on wire 53 is again reduced to its normal ground level. The resulting cathode voltage of this tube is illustrated at line B of Fig. 5A.

This voltage appearing on wire 53 is applied through an isolation resistor 54 to the control grid of a pentode amplifier tube 55 included in the station-call pulse generator 38. This tube has its cathode connected to ground through a biasing resistor 56, and its screen grid is connected through a screen dropping resistor 57 to (B+). The plate is connected to plate load resistor 58 to (B+) also. The suppressor grid of this tube is connected through a coupling capacitor 59 to wire 42 so that the suppressor grid is, in effect, gated by the 100 c.p.s. square wave pulses obtained from the 100 c.p.s. multivibrator.

Normally tube 55 is in a nearly nonconductive condition because of the cathode bias provided by the flow of screen current through the cathode resistor 56. This tube can become conductive with respect to its plate-cathode circuit only when its control and suppressor grids are concurrently being gated with positive-going voltages.

The suppressor grid of this tube received such a positive-going voltage pulse for five milliseconds each one-hundredth of a second from the 100 c.p.s. multivibrator 15. Since the control grid is gated from cathode 51 of the multicathode counting tube 46, it receives a positive-going voltage pulse only for each twelfth pulse appearing on wire 42 and applied to this scale of twelve divider. Although the control grid of tube 55 is thus positively gated for an interval of ten milliseconds, since it is for this length of time that the glow remains on cathode 51, tube 55 can remain conductive only for the duration of the voltage pulse it receives on its suppressor grid from the multivibrator and these pulses are of five milliseconds duration. As a result, tube 55 becomes conductive and provides a decrease in its plate potential for an interval of five milliseconds as shown at line C of Fig. 5A. As a result of the action of the scale-of-twelve divider, these negative-going voltage pulses of the station-call pulse generator occur concurrently with every twelfth output pulse of the 100 c.p.s. multivibrator.

The negative-going output pulses of tube 55 are applied to wire 60 and from there through a coupling capacitor 61 and resistor 62 to the control grid of triode tube 63 included in pulse former 39. This pulse forming circuit organization comprises tube 63 which has its control grid connected through resistors 62 and 64 to the (B+) source of voltage. As a result of this connection, tube 63 is normally in a fully conductive condition. Its control grid is, however, at substantially the same voltage as the grounded cathode because the flow of grid current through the high resistance of resistors 62 and 64 so reduces the grid voltage that the grid is only very slightly positive with respect to the cathode.

Any positive-going voltage variation applied through the differentiating capacitor 61 to the grid of tube 63 merely tends to produce an increase of grid current without producing any effective increase of grid-cathode voltage across the low impedance circuit existing between grid and cathode. However, when a negative-going voltage variation appears on wire 60, capacitor 61 abruptly discharges and produces a negative-going voltage variation at the grid of tube 63 that causes this tube to become fully cut off. As a result of this action, the plate voltage of this tube, which is normally at a low value because of the flow of plate current through resistor 65, rises abruptly to a high value substantially equal to that of the (B+) source. The duration of this condition is dependent on the time required for capacitor 61 to discharge. As capacitor 61 discharges, the grid voltage rises exponentially toward the voltage of the grounded cathode and, as the grid-cathode voltage passes through the cut-off point, tube 63 again becomes conductive and its plate voltage is then reduced to its normal low value. In this way, each negative-going voltage variation on wire 60 is effective to produce a positive-going voltage pulse at the plate of this tube. The time constant for the discharging of capacitor 61 is selected to provide a positive-going pulse of about five milliseconds duration at the plate of tube 63. Consequently, the output voltage provided by this pulse former 39 is substantially the same as that provided by the station-call pulse generator 38 and shown at line C of Fig. 5A with the exception that the polarity is reversed.

It is occasionally required that a pulse forming circuit of this kind be adapted to provide positive-going output pulses whose amplitude is limited to some preselected value substantially lower than that of the (B+) voltage supply. As already described, the voltage at the plate of tube 63 rises abruptly when the tube becomes cut off from its normally low value to a value approximately equal to that of the (B+) source of power. The pulse former 71 comprising tube 66 is similar to that just described with the exception that there are two resistors 67 and 68 connected in series in the plate circuit of the tube with the junction of these resistors connected through a capacitor 69 to ground. Under normal conditions, with tube 66 in a conductive condition, there is a voltage drop across the resistors 67 and 68 produced by the plate current of tube 66. A voltage then exists at the junction of these two resistors which is determined primarily by their relative values, and the capacitor 69 is then charged to this value of voltage. When tube 66 is made momentarily nonconductive by the negative-going trailing edge of the output pulse provided by the pulse former 39, the plate voltage of tube 66 rises abruptly but can now rise only to the voltage level then existing at the junction of resistors 67 and 68. The plate voltage of tube 66 is prevented from rising above this level because the voltage across capacitor 69 cannot be changed instantly. The time constant for the charging of this capacitor is made sufficiently long so that the plate voltage cannot rise appreciably above this preselected voltage level throughout the time that tube 66 is nonconductive. In this way, the positive-going voltage pulses that appear on wire 70 are limited in amplitude to a predetermined value.

Pulse forming circuits of these kinds are used at various places in the circuit organization of this invention. Having described in detail here the manner of operation of one such pulse forming circuit, it is believed unnecessary to again describe it in detail when future reference is made to a circuit of this kind.

The pulses that are obtained from the pulse former 71 and step counter reset 72 both occur in response to the negative-going trailing edge of the output pulse provided by the pulse former 39 so that their time relationship is as shown at line E of Fig. 5A. These pulses are employed in the operation of the units station counter 74 and step counter 33 respectively. These counters are decade type counters employing a single cold cathode grid glow tube for each step. Certain general characteristics of the operation of these counters are required to be made clear in order to explain the manner of operation of the pulse circuits provided at the central office. A brief description will, therefore, be given regarding the general manner of operation of these counting circuits, while a more detailed description of their circuit organization particularly pointing out the novel features of these counters will be given subsequently.

The step counter 33 shown in Fig. 3B is operated throughout its various steps by making its ten tubes successively conductive for the purpose of demarcating the pulse periods of an indication code. Cold cathode grid-glow tubes of the type used in this counter are operated to a conductive condition by driving their grids positive with respect to the cathodes for a long enough interval to cause ionization to occur. When once controlled to a conductive condition, the tube remains in this condition and can be restored to a nonconductive condition only by opening the plate-cathode circuit of the tube or by so reducing the potential between plate and cathode that conduction cannot be sustained. Either of these actions must exist for a long enough time to result in deionization; otherwise the tube will remain in its conductive state.

When any tube of the step counter 33 is in a conductive condition, the grid of the next tube is positively biased to a sufficient extent that the occurrence of a positive-going pulse on bus 83 will result in the firing of such next tube. As each tube is fired, it causes the immediately preceding tube to be extinguished. Thus, during each station period, the various tubes of the step counter 33 are fired in succession in response to the positive-going pulses appearing on bus 83.

In order for this counting operation to be properly synchronized, it is necessary that the step counter 33 start each station period with tube 75 of its step No. 0 fired. This is accomplished by the input pulse that is obtained from the plate of tube 9 included in the step counter reset 72. This tube 9 provides a positive-going pulse for each occurrence of a station-call pulse. This positive-going pulse so raises the grid-cathode potential of tube 75 that this tube is assured of becoming conductive. When this occurs, there occurs also an abrupt reduction of voltage on bus 78 which is produced by the action of the inductor 79 and resistor 80. Any other tube then in a conductive condition is then extinguished in a manner to be described so that only tube 75 of the step counter 33 can be in a conductive state at the beginning of the station period.

The positive-going output pulses obtained from pulse former 71 are applied over wire 70 to the units station counter 74. Each such positive-going pulse, corresponding to the occurrence of a station-call pulse in the code transmitted from the control office, causes an advance of a single count on this counter. For example, if tube 84 of stage No. 0 is conductive, the occurrence of a positive-going pulse on bus 70 causes tube 85 of stage No. 1 to be conductive while tube 84 is then at the same time extinguished. Counter 74 is a ring type of counter in that the next input pulse on bus 70 to occur when tube 86 of stage No. 9 is conductive results in tube 84 of stage No. 0 again becoming conductive. Thus, this counter operates repeatedly through a cycle of operation wherein each tube is made conductive in succession.

Each time the units station counter 74 is restored by an input pulse to its initial condition wherein tube 84 of its stage No. 0 is conductive, an input pulse is applied to the tens counter driver 88. This pulse is effective as will be described to supply an input pulse to the tens station counter 90 to advance this counter a single step.

Each time that tube 84 of the units station counter 74 becomes conductive, there is an abrupt rise in voltage across its cathode resistor 115 so that a positive-going voltage variation is applied over wire 87 and through resistor 155 to the grid of tube 156. The cathode of this tube is normally biased positively by the voltage divider comprising resistors 157 and 158 connected between (B+) and ground. Resistor 158 is by-passed by capacitor 159 to provide a stable bias voltage for this tube. Tube 156 is normally cut off by its positively biased cathode, but when its grid is driven positive by the positive-going voltage variation applied to it over wire 87, it becomes momentarily conductive and as a result its plate voltage decreases because of the increased flow of plate current through plate load resistor 160. This negative-going voltage variation is applied through the differentiating capacitor 161 and through resistor 162 to the grid of tube 163. Tube 163 is included in a pulse forming circuit similar to those already described so that the negative-going voltage variation causes a positive-going pulse to appear on wire 89 which supplies the input counts to the tens station counter 90. These pulses on bus 89 are of an amplitude sufficient to fire any cold cathode tube which then has its grid positively biased from the cathode of the preceding tube.

When the system is first put into operation, none of the tubes of the station counter 90 is conductive. However, by operating the start push button 123, an operator can cause a positive biasing voltage to be applied from the terminal (B+), through back contact 164 of push button 123, over wire 165 and through resistors 166 and 167 to the grid of tube 168 included in stage No. 0 of this counter 90. As a result, while push button 123 is so actuated, the first occurring input pulse on wire 89 will result in the firing of tube 168 so that the tens station counter 90 will be properly put into operation and then continue to operate properly in response to the pulses appearing on bus 89.

The tens station counter 90 is similar to the units station counter 74 previously described. It advances a single step for each pulse received from the tens counter driver and is organized as a ring counter so that it will restore itself to the zero condition at the end of a cycle.

Thus, the tens station counter 90, in effect, keeps track of how many times the units counter 74 has operated through a complete cycle of operation. Since the system of the present invention is organized in the embodiment illustrated to accommodate forty field stations, there are four individual stages provided for the tens station counter 90. The tens counter 90 and units counter 74 together then establish the station period in effect at any time as shown at lines F to K of Fig. 5A.

On the last or fortieth station period, the station counters are in the condition wherein the tube of stage No. 9 of the units station counter 74 and the tube of stage No. 3 of the tens station counter 90 are conductive. As a result, positive gating voltages then appear on wires 91 and 92 which connect respectively from the cathodes of these conducting tubes, through rectifiers 93 and 94, and through resistor 95, to the control grid of tube 96 included in the synchronizing circuit 97. The junction of the rectifiers 93 and 94 is connected through a resistor 611 to (B+). When the two counting tubes are in their normal nonconductive condition, the junction of the rectifiers 93 and 94 is connected through these rectifiers and through low impedance circuits comprising the cathode resistors of the nonconductive tubes to ground so that junction point 98 is at a relatively low voltage as there is then a large voltage drop across resistor 611. On the station period for field station No. 39, however, the potential on wires 91 and 92 is raised as a result of the cathode voltage drop on the conductive counting tubes, thereby raising the voltage at junction 98 and also the voltage on the grid of tube 96.

Since the cathode of tube 96 is positively biased by the voltage dividing network provided by resistors 99 and 610, this tube 96 can become conductive only when both its control and suppressor grids are concurrently positive by a sufficient amount to overcome this biasing voltage. Although the control grid of this tube is positively gated in the manner described at the beginning of the station period No. 39, tube 96 cannot become conductive at this time because its suppressor grid is not provided with the proper gating voltage. It is not until the end of the cycle, when the station-call pulse generator 38 provides a negative-going trigger pulse on bus 60 that tube 96 becomes conductive. It is the positive-going trailing edge of this pulse that charges capacitor 101 and sufficiently raises the suppressor grid voltage to allow the tube to become momentarily conductive. When this occurs, there is an abrupt voltage decrease at the plate of tube 96 that is applied through the coupling capacitor 102 to the plate of tube 103. This pulse is also effective through capacitor 104 on the control grid of tube 43.

Tubes 43 and 103 are interconnected to provide a one-shot multivibrator. This multivibrator is normally in the condition wherein tube 43 is conductive since this tube has its control grid connected through resistor 105 to (B+). The negative-going pulse applied to the plate of tube 103 and also to the grid of tube 43 causes the normally conductive tube 43 to become momentarily nonconductive. The resulting increase in plate potential of this tube is then effective to raise the grid voltage of tube 103 so that this tube then becomes conductive. The multivibrator remains in this condition for the length of time required for capacitor 104 to discharge to its new steady state value and allow the grid voltage of tube 43 to rise to the cutoff level for the tube. Then tube 43 becomes conductive, with tube 103 becoming simultaneously nonconductive. The time constants of this circuit are so selected that the multivibrator will remain in the condition wherein tube 43 is nonconductive for a period of time approximately equal to one station period as shown at line D of Fig. 5A. During this time, tube 40 of the 100 c.p.s. multivibrator 15 no longer is provided with a low impedance path to ground. This causes the multivibrator to become inoperative during this time so that the 100 c.p.s. square wave pulses can no longer appear on bus 42. As a result, such pulses cannot be applied to the timing pulse input of the carrier transmitter, and timing pulses cannot, therefore, be transmitted. In this way, the synchronizing period indicated in Fig. 5A at line L is inserted into each cycle of operation. When the multivibrator included in the synchronizing circuit 97 restores itself to its normal condition with tube 43 once more conductive, the 100 c.p.s. multivibrator 15 can again operate. Square wave pulses then are applied to the bus 42 to the scale-of-twelve divider and also to the carrier transmitter so that timing pulses can again be transmitted and a new cycle of operation begun.

The general operation of the circuit organization at the control office can thus be summarized as follows: the basic frequency determining circuit of the system is the 100 c.p.s. multivibrator 15. It supplies its output pulses to a frequency dividing circuit that provides a distinctive output for each twelfth output pulse of the basic timing multivibrator. The timing pulses provided by the multivibrator are each applied to the carrier transmitter 17 and result in the transmission of a timing pulse at the nominal carrier frequency reserved for the transmission of pulses from the central office. For each special station-call pulse as determined by the scale-of-twelve divider, the station-call pulse generator 38 provides an output over bus 60 to the carrier transmitter that causes the output frequency of the transmitter to be slightly shifted in value so that a distinctive station-call pulse is thereby transmitted to each field station. For each occurrence of a station-call pulse, the units station counter 74 advances a step to thereby demarcate a new station period. Each time the units station counter has operated through a cycle of operation, the tens station counter 90 advances a step. When the counting capacity of these counters has been reached corresponding to the number of stations the system is designed to accommodate, an input is provided to the synchronizing circuit 97 which, for a limited time, is effective to prevent operation of the 100 c.p.s. multivibrator. With this master timer momentarily inoperative, the entire system at the central office becomes inactive and remains in this state until the synchronizing circuit 97 has its multivibrator restored to the normal condition so that the 100 c.p.s. multivibrator can again operate. At the same time, the station counters, both units and tens counters, are restored to their 0 conditions so that they can again count the station periods of the new cycle of operation. This sequence of events occurs repeatedly so that cycles of operation having the characteristics shown in line L of Fig. 5A are repeatedly transmitted from the central office to each field station in the system.

*Operation of counting circuits*

Cold cathode tube counters are used in both the central office and at each field station for counting the steps of each station period and also for counting the station periods in a cycle. The description to be given will be concerned particularly with the units station counter 74 at the central office shown in Fig. 3D. Although the counters at the field stations are similar in many respects to those at the central office, there are certain distinguishing differences and these will later be described in more detail.

The units station counter 74 of Fig. 3D is a decade type counter having ten cold cathode tubes, one for each count of its counting capacity. Input pulses are applied to the counter over bus 70, and each pulse is effective to advance the counter a single step. The anodes of all the counting tubes are connected over a common bus 110, through an inductor 111, and resistor 112, to the (B+) terminal. The cathode of each tube is connected through two series resistors to ground, with the exception of tube 84 which is connected through three resistors 113, 114, and 115 in series to ground. The grid of each tube is connected through a resistance network to the cathode circuit of the preceding tube. Tube 85, for example, has its grid connected through resistor 116 and resistor 117 to the junction of resistors 113 and 114 in the cathode circuit of tube 84. Since this station counter is a ring counter, its first tube 84 of stage No. 0 has its grid connected similarly through a resistance network to the cathode of the last tube 86 of stage No. 9. Each grid is also connected through the same coupling resistance and a capacitor to the input bus 70. Tube 85 of stage No. 1 is, for example, connected through resistor 116 and capacitor 118 to input bus 70. The cathode resistance of each tube is shunted by a capacitor such as capacitor 119 in the cathode circuit of tube 85.

Each positive-going input pulse appearing on bus 70 is effective to raise the voltage between grid and cathode of each tube but not enough to fire that tube by itself. Any of the tubes of the counter can be fired by the positive-going input pulse only if its grid is at that time positively biased from some other source. Thus, if tube 84 is conductive, there is a voltage drop across its cathode resistors 114 and 115 which causes a positive biasing voltage to be applied through resistors 117 and 116 to the grid of tube 85. If then a positive-going input pulse appears on bus 70, this pulse will raise the grid-cathode potential of tube 85 sufficiently to cause this tube to be fired. None of the other tubes of the counter can be fired at this time because the positive pulse on bus 70 is not by itself effective to raise the grid voltage of any other tube of the counter sufficiently to fire that tube.

Each of the tubes of the counter has a capacitor connecting its cathode to ground. For reasons which will later be described, the first tube 84 of this counter has its cathode capacitor connected between the cathode and junction of resistors 114 and 115. The cathode capacitor provided for each stage of the counter is effective to result in the extinguishing of the associated cold cathode tube when the next succeeding tube is fired in response to an input pulse appearing on bus 70. If, for example, tube 85 has been fired by such an input pulse, the capacitor 119 associated with this tube becomes charged to the voltage level existing between this cathode and ground. Upon the firing of the next tube 120 of this counter in response to the next pulse appearing on bus 70, there is an abrupt decrease in voltage on bus 110 resulting in part from the increased voltage drop across resistor 112 and in part from the effect of the inductor 111 which has a voltage induced therein by the sudden current change which occurs. These effects combine to immediately lower the voltage on bus 110 for a short interval. The potential at the cathode of tube 85 is maintained at its elevated value by reason of the charge on capacitor 119 which cannot be instantaneously changed. Therefore, the decrease in potential on bus 110 as tube 120 fires cannot be accompanied by a decrease in voltage at the cathode of tube 85. The plate-cathode voltage of this tube 85 is, therefore, for a time driven below the minimum value required to maintain the tube conductive so that it is then extinguished.

The capacitor 121 in the cathode circuit of tube 120 cannot immediately become charged as tube 120 is fired so that the cathode potential of this tube is still at a low value when the abrupt decrease of voltage on bus 110 occurs. Therefore, this voltage drop on bus 110 is not effective to extinguish the just-fired tube 120. In this way, as each tube of the counter is fired in succession, only the tube of the immediately preceding stage is extinguished as is desired.

Subsequent input pulses appearing on bus 70 cause the glow condition to be transferred from tube to tube of the counter. When tube 86 is eventually fired, it provides an enabling bias to be supplied over bus 122 to the grid circuit of tube 84 of step No. 0. Consequently, the next input pulse on bus 70 results in firing of tube 84 and the extinguishing of tube 86. In this way, the successively appearing input pulses each result in the advance of a single step of the counter 74.

When power is first applied to the system, none of the tubes of the counter 74 is fired so that there is then no biasing voltage effective on the grid of any other tube of the counter. Under these circumstances, the positive-going input pulse on bus 70 cannot result in the firing of any counter tube. To overcome this difficulty, the circuit organization is provided with an enabling bias through a contact of start push-button 123. Closure of the back contact 124 of this push-button causes a positive biasing voltage to be applied through resistors 125, 126 and 127 to the grid of tube 84. The next appearing input pulse on bus 70 is then effective to fire tube 84 of stage No. 0 so that the counter is assured of being put into operation.

The step counter 33 in the central office shown in Fig. 3B is similar to the unit station counter 74 just described with the exception that the step counter is not a ring type counter. In other words, the occurrence of an input pulse on its input bus 83 at a time when the tube of its step No. 9 is fired, does not result in the firing of the tube of its step No. 0. The step counter 33 is restored to its initial condition where the tube 75 of its step No. 0 is fired only as the result of an input pulse being provided directly to the grid circuit of the tube step No. 0 over bus 130. Such pulses appear on bus 130 for each occurrence of a station-call pulse in the code cycle transmitted from the central office as has been described.

The counters provided at the field stations are used in supplying gating voltages to various associated circuits. It is highly desirable that the gating voltages provided in this way be relatively rectangular in shape, having steep leading and trailing edges so that the gating voltages are effective for the proper lengths of time but without overlapping each other. To provide this highly desirable feature, the step counter and station counters provided at each field station are modified in certain respects as compared to those used at the central office and which have just been described.

The cathode of each counting tube of the step counter 135 shown in Fig. 4B, is connected through three series resistors to ground. Tube 136 of step No. 0 is thus connected through resistors 137, 138 and 139 to ground. The grid of tube 140 of the succeeding stage of the counter is connected through resistors 141 and 142 to the junction of resistors 137 and 138. The grid of each tube such as tube 140 is also connected through its decoupling resistor 141 and capacitor 143 to the input bus 144. The anode of each counting tube is connected to bus 145 which is then connected through inductor 146 and resistor 147 to (B+).

The capacitor in the cathode circuit of each counting tube is not connected from the cathode directly to ground but is instead connected from the cathode to a point above ground in the cathode circuit. Capacitor 148 in the cathode circuit of tube 140 is thus connected from the cathode of this tube to the junction of resistors 149 and 150.

When the cathode capacitor of any counting tube is connected from the cathode of that tube directly to ground as was done in the counters of Figs. 3B and 3D, the firing of that tube in response to an input pulse cannot result in the abrupt increase of voltage at the cathode of that tube because the capacitor cannot instantaneously change its charge. Consequently, the voltage at the cathode or at any intermediate point in the cathode circuit cannot abruptly rise and fall as the tube is respectively fired and extinguished, and, for this reason, sharp gating voltages cannot be generated by such a counter.

By connecting the cathode capacitor as shown in Fig. 4B so that its lower terminal, as in the case of capacitor 148 is connected to the junction of resistors 149 and 150 rather than directly to ground, it is possible to obtain a positive going gating voltage at the junction of these resistors having abrupt leading and trailing edges. Thus, when tube 140 is fired by an input pulse, the change of voltage in the cathode circuit cannot occur at the first instant across capacitor 148 but instead appears entirely and instantaneously across the cathode resistor 150. Similarly, when the tube is extinguished, the capacitor 148 cannot immediately discharge so that the voltage across this capacitor and thus across the resistors 149 and 151 can change only at an exponential rate whereas the voltage across resistor 150 will immediately reflect the change of voltage occurring in the cathode circuit. The result is that, during the interval that tube 140 is conductive, a positive-going gating voltage is provided on bus 152 having relatively abrupt leading and trailing edges which facilitate the operation of the circuit organization being gated by these voltages.

*Field station apparatus*

The series of pulses received over the line wires at each station from the central office are applied through the band-pass filter 14 at that station to the carrier receiver 21. This receiver is effective to provide a positive-going output pulse on wire 170 for each occurrence of a station-call pulse in the received code. Similarly, the receiver applies a positive-going pulse to wire 171 for each timing pulse occurring in the received code. These outputs of the receiver are illustrated at lines N and M respectively of Fig. 5B.

Both the timing pulse and station-call pulse outputs of the receiver are applied to the pulse combiner 25. The pulses appearing on wire 170 and corresponding to the station-call pulses in the code are applied through capacitor 173 and isolation rectifier 174 to the grid of tube 175. The pulses appearing on wire 171 resulting from timing pulses in the code are similarly applied through capacitor 176 and isolation rectifier 177 to the same grid. Resistors 178 and 179 are provided to establish discharge paths for the capacitors 173 and 176 respectively.

The pulse combiner 25 is essentially a one-shot multivibrator having the two tubes 175 and 180. Since the grid of tube 180 is connected through resistor 181 to (B+), tube 180 is normally in a conductive condition. Its low plate voltage results, by action of the voltage divider comprising resistors 182 and 183, in a relatively low grid voltage for tube 175. This low grid voltage, combined with the high cathode voltage resulting from the flow of tube 180 plate current through cathode resistor 184, causes tube 175 to be cut-off. For each positive-going input pulse applied to the grid of tube 175, this tube becomes conductive and tube 180 becomes nonconductive. This condition is maintained for an interval dependent upon the time constant for the discharging of capacitor 185. This time constant is so selected that the multivibrator remains in its abnormal state for approximately five milliseconds. Since an input pulse appears at the grid of tube 175 each ten milliseconds, this multivibrator in effect operates at a 100 c.p.s. rate with the two tubes thereof being alternately and successively conductive for five millisecond intervals. With tube 180 normally conductive, the output voltage of this pulse combiner 25 is normally at a low lever but abruptly rises as each input pulse causes tube 180 to become nonconductive. As a result, the output voltage of this pulse combiner 25 comprises substantially square wave positive-going voltage pulses whose leading edges are substantially coincident with the occurrence of the positive-going output pulses from carrier receiver 21.

The output pulses appearing at the plate of tube 180 of pulse combiner 25 are applied through differentiating capacitor 186 and through resistor 187 to the grid of tube 188 included in pulse former 189. The pulse former 189 is similar to those previously described so that each negative-going trailing edge from the pulse combiner 25 is effective to cause a positive-going trigger pulse to appear on wire 190 as shown at line 0 of Fig. 5B. Each positive-going pulse appearing on output wire 170 of the carrier receiver 21 and corresponding to the occurrence of a station-call pulse in the receiver code is applied not only to the pulse combiner 25 as described but also through capacitor 191 and resistor 192 to the grid of a cold cathode grid glow tube 193 included in the station counter driver 194. The grid of tube 193 is positively biased by means of a voltage obtained from the voltage divider comprising resistors 194 and 195 connected between (B+) and ground. This biasing voltage is applied through the parallel-connected resistor 196 and rectifier 197 and through resistor 192 to the grid of this tube. Consequently, each positive-going pulse on wire 170 is effective to fire the cold cathode tube 193.

Cold cathode tube 200 in the station counter driver 194 has the positive-going trigger pulses from the pulse former 189 applied to its control grid through capacitor 198 and resistor 199. These trigger pulses are of limited amplitude so that they can fire tube 200 only if its grid is properly biased from another source. This bias is obtained from the cathode of tube 193 and applied to the grid of tube 200 through resistors 202 and 199. The trigger pulse from the pulse former 189 occurs in response to the trailing edge of the station call pulse output from the receiver 21 as shown at line 0 of Fig. 5B. However, tube 193 is fired five milliseconds previously by the leading edge of the same pulse so that there is sufficient time for capacitor 201 to charge and provide the required bias at the grid of tube 200.

When tube 200 is fired, there is a sudden drop in its plate voltage because of the immediate voltage drop produced across plate resistor 203. Capacitor 204 connecting the plate of tube 200 to the junction of resistors 205 and 206 in the plate circuit of tube 193 then discharges and so reduces the plate voltage of tube 193 with respect to the voltage at its cathode which is maintained positive by the now charged capacitor 201 that tube 193 is extinguished.

At the instant that tube 200 is fired, the resistance effective in its plate-cathode circuit comprises essentially only the resistors 203 and 207 since resistors 208 and 209 are, in effect, at this time shunted by the uncharged capacitors 210 and 211 respectively. Except for the relatively small fixed voltage drop appearing across the conducting tube 200, substantially half of the voltage existing between (B+) and ground appears across resistor 207 with the other half of this voltage being developed across resistor 203. As capacitors 210 and 211 become charged, the resistance in the plate-cathode circuit is effectively increased and, as these condensers become fully charged, the resistance effective in the circuit of the tube is so large that it results in the tubes becoming nonconductive. Therefore, a positive-going voltage pulse of limited duration appears at the cathode of tube 200 and on wire 212.

The station counter driver 194 may thus in summary be said to receive a pulse from the station-call pulse output of carrier receiver 21 which is effective on its positive-going leading edge to fire tube 193. Each station-call pulse also results in the generation of a pulse by the pulse former 189 that is applied to the grid of tube 200, but this pulse occurs approximately five milliseconds after the firing of tube 193 so that the firing of this tube 193 can be first effective to provide the required bias on the grid of tube 200. When tube 200 is fired, its drop in plate voltage results in the extinguishing of tube 193. Tube 200 is provided with a circuit organization which causes it to be self-extinguishing so that a positive-going output pulse is provided from its cathode circuit for a limited time.

Each positive-going trigger pulse obtained from the cathode of tube 200 (see line P, Fig. 5B) is applied over bus 212 as an input to the units station counter 220 of Fig. 4C. Each of these pulses is therefore effective to advance the counter 220 by one input count. The cathode of the tube for the last stage No. 9 of this counter is connected to the input or grid circuit of the tube of step No. 0 to form a ring or repeating type of counting chain. The trigger pulses on bus 212 are also applied through the isolation rectifier 213 of Fig. 4A to bus 214 and over this bus and through capacitor 215 and resistor 216 to the grid of tube 217 of the units station counter. In this way, an output pulse from the station counter driver 194 occurring at a time when step No. 9 of the counter 220 has its tube fired results in the firing of tube 217 of step No. 0. In this way, the units station counter 220 repeatedly operates through a cycle of operation as the input pulses are successively supplied to it from the station counter driver 194.

The station tens counter driver 223 receives an input pulse on its control grid from the cathode circuit of tube 200. Each time tube 200 is fired, a positive-going voltage variation is applied through capacitor 224 and resistor 225 to the grid of tube 226. These pulses are effective to fire tube 226 only if the grid of this tube is then being properly biased over wire 228 from the tube included in stage No. 9 of the units station counter 220. Thus, when the counter 220 has operated through its various steps so that finally its tube 221 of step No. 9 has been made conductive, it is desired that the next input pulse derived from a station-call pulse not only return the counter 220 to its zero condition but also supply an input to the tens station counter 227 so as to advance this counter by a single step. Accordingly, when tube 221 of the units station counter 220 is fired, it provides a positive voltage on wire 228 and through resistors 229 and 225 to the grid of tube 226 of the station tens counter driver 223. As a result, the next output pulse of the station counter driver 194 is not only effective over bus 212 and bus 214 to advance the units station counter 220, but is then also effective to fire tube 226 so that a positive-going output pulse appears on wire 230 which is the input bus for the tens station counter 227.

The units and tens station counters 220 and 227 thus together provide a step-by-step count of the number of station-call pulses received at a field station. The operation of these counters is represented in the waveform diagram of Fig. 5B at lines Q—T. These waveforms represent approximately the voltage appearing in the cathode circuits of the corresponding cold cathode counting tubes. At each field station, connections are made from the units and tens station counters 220 and 227 respectively to various other field station circuits. These connections are made to selected steps of the counters dependent upon the particular number of that field station. The connections shown by way of example in Fig. 4C are those which would be provided for station No. 2.

The step counter driver 231 provides positive-going trigger pulses on bus 144 that cause the step-by-step operation of the step counter 135. The waveforms shown at lines V—Y of Fig. 5B graphically represent the manner of operation of the step counter. The step counter driver 231 is gated so that it can provide these output pulses only on the particular station period intended for that station. To provide this gating function, a connection is made from the junction of resistors 232 and 233 in the grid circuit of tube 234 over wire 235 to the junction of two diode rectifiers 236 and 237 illustrated in Fig. 4C. Since the field station shown is assumed to be No. 2, the other terminals of these rectifiers 236 and 237 are connected over wires 286 and 287 to the cathode circuits of tubes 239 and 240 included in stage No. 2 of the units station counter and stage No. 0 of the tens station counter respectively.

Resistor 233 in the grid circuit of tube 234 is of a relatively large value of resistance as compared to the forward resistance of rectifier 236 in series with resistor 238 in the cathode circuit of tube 239 of stage No. 2 included in units station counter 220. Consequently, as long as tube 239 is nonconductive, and similarly if tube 240 of the tens station counter 227 is nonconductive, the effect of the voltage divider formed by this cathode circuit is such that the voltage at the junction of resistors 232 and 233 is very low and not sufficient to provide the required biasing voltage for tube 234. However, if both tubes 239 and 240 of the counters 220 and 227 respectively are conductive, the voltage at the junction of resistors 232 and 233 is substantially raised with the result that the tube 234 then has its grid suitably biased so that it can become conductive in response to each positive-going input pulse received through its associated coupling capacitor 245. Therefore, during the station period allotted in a cycle for the transmission of the indications from station No. 2, the two station counters 220 and 227 are effective by this "and" gating circuit to properly bias the cold cathode tube included in the step counter driver 231. It is therefore only during this station period that the step counter driver can provide the trigger pulses required to operate step counter 135.

Tube 234 is provided with a self-extinguishing circuit means similar to that provided for tube 226 included in the station tens counter driver 223. Consequently, tube 234 remains conductive for only a brief interval and is effective each time it is fired to supply a positive-going trigger pulse on bus 144.

Although the step counter 135 is operated through its various steps only on the particular station period relating to each station, it must necessarily start its step counting operation each cycle from the proper condition, i.e. with the tube 136 of its step No. 0 conductive. To accomplish this, bias and trigger pulses are applied to step No. 0 at the beginning of each station period from the station counter driver 194 of Fig. 4A. Each station-call pulse received at the field station causes tube 193 to become conductive as described. The cathode voltage of this tube 193 is then raised so that a positive voltage appears on bus 255 and is applied through resistor 256 and resistor 257 to the grid of tube 136. This bias voltage is not of itself able to cause tube 136 to become conductive. However, five milliseconds after this rise of voltage on bus 255, tube 200 becomes conductive and charges capacitor 258 to momentarily raise the voltage on the grid of tube 136. This positive-going pulse, in the presence of the biasing voltage received over bus 255, sufficiently raises the voltage at the grid of tube 136 to ensure that this tube becomes conductive. These resetting voltages are effective on step No. 0 of the step counter 135 at the beginning of each station period although normally the first-occurring station-call pulse following operation of the step counter 135 on its respective station period is effective to reset the counter.

The synch period detector 30 shown in Fig. 4A provides a distinctive output when it has detected the occurrence of the synchonizing period in the stream of pulses transmitted from the central office. This distinctive output causes the resetting of both the units station counter 220 and the tens station counter 227 shown in Fig. 4C to ensure that these counters will start the new cycle from their zero conditions.

The synch period detector 30 comprises a triode amplifier tube 360 which receives an input on its grid circuit from the output of the pulse combiner 25. The output of the pulse combiner is applied through a capacitor 361, resistor 362, rectifier 363 in the forward direction, and resistor 364, to the grid of tube 360. The junction of rectifier 363 and resistor 364 is connected through the parallel combination of resistor 366 and capacitor 367 to ground. Each positive-going voltage variation at the plate of tube 180 of pulse combiner 25 results in the charging of both capacitors 361 and 367 through resistor 362 and rectifier 363 in the forward direction. Negative-going voltage variations occurring at the plate of tube 180 are not effective to cause the discharging of capacitor 367 because the discharge circuit includes the high back resistance of rectifier 363. Consequently, as the pulse combiner 25 continually provides square wave output pulses throughout a cycle, capacitor 367 becomes and remains positively charged to provide thereby a positive voltage on the grid of tube 360. If the pulse combiner 25 fails to provide these output pulses for a time such as during the synchronizing period when no pulses are received from the central office, capacitor 367 discharges through resistor 366 and lowers the grid voltage of tube 360. Resistor 365 is provided to establish a discharge path for capacitor 361.

Tube 360 has its cathode positively biased by being connected to the junction of voltage dividing resistors 368 and 369 which are connected between (B+) and ground. Capacitor 370 shunts resistor 369 to provide a stable bias voltage for this tube. Throughout a cycle of operation, capacitor 367 is charged positively and so raises the grid voltage of tube 360 that this tube is conductive despite its relatively high cathode voltage. There is thus a flow of plate current through plate resistor 371 that causes a low plate voltage for the tube. During the synchronizing period, capacitor 367 discharges because it no longer receives the charging pulses from the pulse combiner 25. The grid voltage of tube 360 is then lowered sufficiently below that of the cathode so that this tube becomes nonconductive. Its plate voltage then rises abruptly so that there is a positive-going voltage variation then applied through capacitor 372 and resistor 373 to the grid of cold cathode tube 374.

Tube 374 has a positive bias voltage applied to its grid through resistors 373 and 375 from the voltage divider comprising resistors 194 and 195. This positive bias voltage enables tube 374 to be fired by the positive-going voltage variation it receives from the plate of tube 360 when this tube becomes nonconductive. When tube 374 is thus fired in the synchronizing period, there is a sudden flow of current through its cathode circuit comprising resistor 376 and capacitor 377 shunting resistor 378. The voltage at the cathode is then suddenly raised by the voltage drop in its cathode circuit. Tube 374 is provided with a self-extinguishing circuit means similar to that provided for tubes 200 and 226 and previously described. Thus, tube 374 remains conductive only for a short time and provides a positive-going trigger pulse at its cathode as shown at line U of Fig. 5B. Bus 379 is connected through capacitor 380 and resistor 381 to the grid of tube 240 included in stage No. 0 of the tens station counter 227 of Fig. 4C. This positive-going voltage pulse is of sufficient amplitude that it raises the grid voltage of tube 240 to an extent required to make this tube conductive regardless of which tube of the tens station counter 227 may then be in a conductive state. In this way, the tens station counter 227 is restored to its initial condition so that it may correctly count the station-call pulses of the new cycle.

The positive-going cathode voltage pulse of tube 374 is also applied through capacitor 382 and rectifier 383 to bus 214. This bus 214 is connected through capacitor 215 and resistor 216 to the grid of tube 217 included in stage No. 0 of the units station counter 220. As with the tens station counter, this pulse is of sufficient amplitude to ensure that tube 217 is made conductive regardless of whether it is then receiving a bias voltage from stage No. 9 of the counter. Thus, detection of the synchronizing period also causes the units station counter 220 to be properly reset to its initial condition for the beginning of the next cycle of operation.

As previously described, bus 214 which supplies an input to the grid circuit of tube 217 of the units station counter 220, also receives a pulse through rectifier 213 from bus 212 at the beginning of each station period. This pulse which is obtained from the station counter driver 194 is of limited amplitude and can make tube 217 conductive only if it is then properly biased from tube 221 of stage No. 9 of this counter. This pulse therefore provides the same function as the other input pulses to the counter applied to it directly over bus 212. However, the pulse applied to bus 214 from the synch period detector 30 is of larger amplitude and causes tube 217 to be fired even in the absence of the biasing voltage. This pulse is then effective to reset the counter 220 as is required at the beginning of a cycle. Both these pulses can be applied to the single bus 214 connecting with the grid circuit of tube 217 as a result of the isolation rectifiers 213 and 383 which effectively prevent the large amplitude pulse provided by tube 374 from appearing on bus 212.

The various counters at each field station are organized to clear out with all tubes nonconductive at the end of the station period for that station. This is accomplished by the counter clearout 260 of Fig. 4C. At the end of the station period intended for this station, the tube included in step No. 9 of the step counter 135 becomes conductive. There is then a rise in voltage at the junction of resistors 261 and 262, and this positive-going voltage variation is applied through resistor 263 and rectifier 264 to the grid of a gas discharge tube 265. A capacitor 266 is connected from the junction of resistor 263 and rectifier 264 to ground. Rectifier 264 acts as a clamping diode to prevent the voltage at the grid of tube 265 from rising above that to which capacitor 266 is charged.

Tube 265 is provided with a fixed cathode bias by means of the connection of its cathode to the junction of resistors 267 and 268. This positive cathode bias voltage prevents tube 265 from becoming conductive unless the voltage at the grid is suitably raised with respect to the cathode. Normally, when step No. 9 of step counter 135 is in the condition wherein the associated tube is nonconductive, capacitor 266 is discharged. Under these circumstances, a positive-going pulse appearing on bus 144 cannot be effective to raise appreciably the voltage on the grid of tube 265, because an attempt to raise the voltage upon this grid merely results in the charging of capacitor 266 through the low forward resistance of rectifier 264. However, when step No. 9 of step counter 135 has its associated tube conductive, the capacitor 266 charges to a positive voltage. This positive voltage cannot appear directly on the grid of tube 265 because it encounters the high back resistance of rectifier 264. However, any subsequently occurring positive-going pulse on bus 144 when capacitor 266 has had opportunity to charge to a positive voltage is effective to raise the voltage at the grid of tube 265 because the pulse is not, in effect, absorbed by an uncharged capacitor. Thus, a pulse on bus 144 under these circumstances causes tube 265 to become conductive.

The plate voltage for tube 265 is provided from the plate buses supplying the various counters. For example, a connection is provided (see Fig. 4C) from (B+), through resistor 269, inductor 270, bus 271, and through rectifier 272 in the forward, low resistance direction and then through the series connected resistors 273 and 274 to the plate of tube 265. Similar connections are provided from the plate supply buses for the step counter 135 and tens station counter 227 to the plate of tube 265.

When tube 265 becomes conductive in the manner described, there is a sudden large flow of current through capacitor 298 connected in parallel with resistor 273. This flow of current through resistor 269 and inductor 270 associated with units station counter 220 abruptly reduces the voltage on bus 271 to such an extent that any conductive tube in the counter is extinguished. The same action occurs with respect to step counter 135 and tens station counter 227 so that all the tubes of the various counters of the field station are extinguished. Tube 265 also has its plate voltage reduced to such an extent because of the voltage drop across resistors 273 and 274 and the inductive effect of the various inductors associated with the plate supply buses of the different counters such as inductor 270 of units station counter 220 that this tube 265 is extinguished a very short time after it is fired. The extinguishing effect with respect to the various counters is thus a momentary one and does not affect the counting operation taking place in the next cycle of operation.

A connection is made from the upper terminal of resistor 273 in the plate circuit of tube 265 through a rectifier 275 to (B+). A clamping circuit is thus provided that prevents the voltage at the upper terminal of resistor 273 from momentarily exceeding that of the (B+) supply voltage. Thus, any inductive voltage surge tending to raise the voltage momentarily at this point results in a flow of current through rectifier 275 in the forward, low resistance direction which effectively dampens such voltage pulse and prevents it from causing the improper firing of any tube associated with the various counters.

As the step counter 135 operates throughout its various steps on the particular station period for that station, the tube associated with each step becomes conductive for a ten millisecond interval with the result that the voltage on the respective output buses such as buses 276, 152, 278, etc. sequentially rises and falls at ten millisecond intervals. While the step counter 135 is in its initial or zero condition, bus 276 connected to step No. "0" is at a positive voltage because tube 136 is then conductive. When the step counter becomes effective to count on the proper station period, tube 136 is extinguished as tube 140 becomes conductive so that the voltage on bus 152 then rises at the same time the voltage on bus 276 is lowered. Ten milliseconds later, tube 277 of step No. 2 becomes conductive with a resultant rise in voltage on bus 278. At the same time, tube 140 becomes nonconductive so that the voltage on bus 152 is restored to its original ground level.

Each of these various buses connected to the different steps of the step counter 135 is connected also through a respective isolation rectifier, such as rectifier 279 associated with bus 276, and then through one or more contacts of indication relays to a common point, and then through a resistor 280 to bus 281. Dependent upon the conditions of the indication relays, the junction point 282 to which the various buses are connected is successively raised in potential above ground or remains at ground. For example, during the ten millisecond interval that bus 152 is raised above ground potential, the point 282 will be similarly raised in potential only if a circuit is completed through back contact 283 of relay 1RWP and front contact 284 of relay 1NWP.

An "and" gating circuit is provided from the two station counters 220 and 227 over bus 285, and this gating circuit allows the positive-going voltage pulses at point 282 to appear on bus 281 only on the particular station period on which this station is to transmit its indications. The connections made from bus 285 to the steps of the counters 220 and 227 of Fig. 4C are those which would be made for station No. 2 in a system.

This "and" gating circuit is similar to that provided for the step counter driver 231 of Fig. 4A which has already been described. On any station period other than the No. 2 station period, either or both counting tubes 239 or 240 is nonconductive so that no voltage drop is developed across the cathode resistors of either of these tubes. Consequently, the positive voltage pulses appearing selectively at junction point 282 (Fig. 4B) are, under these circumstances, substantially grounded. This results from the fact that the circuit from the left-hand terminal of resistor 280 to the cathode circuits of tubes 239 and 240 and thence to ground is of low resistance as compared to the relatively high resistance of resistor 280. A voltage divider is thus formed which has the effect of substantially reducing the amplitudes of the pulses on bus 281.

In contrast, on the No. 2 station period when both tubes 239 and 240 are conductive, the voltage on wires 286 and 287 is raised so that the voltage of each pulse on wire 281 cannot decrease below that appearing on wires 286 and 287. Thus, the pulses appearing at junction point 282 appear as pulses of substantial amplitude on wire 281 as well. Of course, the gating voltages on wires 286 and 287 do not affect the voltage on wire 281 on those pulse periods when no voltage pulses appear at junction point 282; these gating voltages are prevented from appearing on wire 281 by the high back resistance of rectifiers 294 and 295.

Bus 281 supplies its voltage consisting of ten millisecond positive-going pulses appearing on selected pulse periods through an isolation resistor 288 to the grid of tube 289 included in the transmitter control amplifier 26 of Fig. 4A. This tube is normally biased to a nearly cut-off condition by the flow of screen current through its cathode resistor 291 and screen dropping resistor 292. Whenever the grid voltage is sufficiently raised by the voltage appearing on bus 281, the tube is conditioned to conduct only provided that its suppressor grid then receives a positive-going voltage from the output of the pulse combiner 25.

The pulses appearing on the grid of tube 289 are of ten millisecond duration since each step of step counter 135 from where these pulses originate remains conductive for a ten millisecond interval. The output pulses of the pulse combiner 25 applied through capacitor 293 to the grid circuit of tube 289 are of five millisecond duration so that tube 289 is selectively made conductive only for five millisecond intervals on each pulse period. Consequently, negative-going voltage variations each of five millisecond duration appear at the plate of this tube whenever a mark is to be transmitted in the indication code. Each of these five millisecond pulses is applied to the mark input of transmitter 27. This transmitter is organized so that the application of a negative-going pulse to its mark input terminal concurrently with the application of a positive-going pulse to its space input terminal causes the transmitter to supply a carrier frequency signal through filter 11 to the line wires 10 for the duration of the transmitter input pulses. Under these conditions, the transmitter frequency is shifted slightly from its normal output frequency to form the distinctive mark character. When no negative-going pulse is received from the transmitter control amplifier 26, the positive-going five millisecond pulse from the pulse combiner 25 is again effective to result in the transmission of a five millisecond carrier pulse, but it now occurs at the normal transmitter frequency to form a distinctive space pulse.

As previously described, the scale-of-twelve divider 37 at the central office (Fig. 3B) causes a station-call pulse to be inserted on every twelfth pulse period in the stream of pulses transmitted from the central office. However, each field station is "driven" to transmit indication pulses on only the first ten of the twelve pulse periods. Thus, the ten pulses constituting the indication code from each station have ample time to be received at the central office before the occurrence of the next station-call pulse demarcates the beginning of the next station period.

At the field station, the timing pulses occurring on the eleventh and twelfth pulse periods are effective on the pulse combiner 25 so that pulses appear at the plate of tube 180. These pulses are applied to the space input of the carrier transmitter 27 through resistor 390. Wire 391 connected to the left-hand terminal of resistor 390 is connected to selected stages of the counters 220 and 227 to form an "and" gating circuit similar to that provided for the step counter driver 231. Thus, it is only when these counters are in the proper condition with tubes 239 and 240 conductive that the output pulses of the pulse combiner are effective to key the carrier transmitter 27. The counter clearout 260, however, causes all the counting tubes to be extinguished at the end of the tenth pulse period when the ten-step step counter 135 has completed its counting operation. Clearing out the counters in this way removes the "and" gate from the input to the transmitter with the result that pulses cannot be transmitted from that station after the tenth pulse period.

Each cold cathode tube of a counter can ordinarily be made conductive by an input pulse only if it is receiving a positive bias voltage from some other counting tube. This arrangement establishes the progression of tube firing of the counter as it responds to a succession of input pulses.

In the normal counting operation, the enabling bias is obtained from the fired cold cathode tube of the preceding stage. However, when the system is initially put into operation by applying power, no counting tube is conductive and effective to supply the bias voltage to some other tube; therefore, some other means must be provided to initially fire a counting tube. As previously described, this is accomplished at the central office by depressing the start push-button 123. Such an arrangement is, of course, not practical at a field station because there would ordinarily not be an operator at a field location. It is instead accomplished at a field station by providing special reset pulses to the No. 0 steps of both the tens and units station counters 227 and 220 that are of sufficiently large amplitude to fire the cold cathode tubes of these counter stages regardless of whether they are then biased or not. These resetting pulses are obtained from the cathode of tube 374 included in the synch period detector 30. When tube 374 is fired, the entire voltage between (B+) and ground, except for the relatively small voltage drop between plate and cathode, appears between the cathode and ground so that a large amplitude pulse appears on buses 379 and 214 and is applied to the grids of tubes 217 and 240 to fire these tubes. The normal input pulses to counter 220 are of about one-half the amplitude of these resetting pulses. Thus, these pulses appearing on bus 212 are obtained from the cathode of tube 200 of the station counter driver 194 and only about one-half of the (B+) voltage can appear at the cathode of this tube when it is fired because the other half of the available voltage appears across the plate load circuit. Consequently, the normal counter input pulses can fire a counting tube only if its grid is biased by the preceding stage, but the large resetting pulse can fire the tube of stage No. 0 even without bias.

The step counter is initially put into operating condition by output pulses received from the station counter driver 194 in the same manner that it is reset in normal operation. The firing of tube 193 at the beginning of a station period causes a positive bias voltage to be applied over wire 255 to the grid of tube 136. When tube 200 is subsequently fired, a positive-going pulse is fed to the grid of the positively biased tube 136, causing it to fire.

*Central office-reception of indications*

The group of mark and space pulses transmitted from each of the various field stations in succession over line wires 10 to the central office is passed through band-pass filter 12 to carrier receiver 31. This carrier receiver distinguishes between the different frequencies used for marks and spaces and provides separate positive-going pulse outputs with a pulse appearing on wire 300 for each space occurring in the received code and similarly a pulse on wire 301 for each mark.

Both space and mark output pulses are applied to a mark-space pulse combiner 302. This circuit organization comprises two triode tubes having their plates connected through load resistor 304 to (B+). The mark output of the receiver on wire 301 is applied through capacitor 305 and resistor 306 to the grid of tube 307 which is provided with a grid leak resistor 308. The space output of the receiver appearing on wire 300 is similarly applied through capacitor 309 and resistor 310 to the grid of tube 311 having a similar grid leak resistor. Tubes 307 and 311 are normally biased to be nonconductive by having both their cathodes connected to the junction of voltage dividing resistors 303 and 331 connected between (B+) and ground. As a result, the voltage at the plates of these tubes is high. When either tube is made more conductive as a result of the application of a mark or space pulse to the grids of tubes 307 or 311 respectively, the increased plate current flow through resistor 304 causes a momentary drop of voltage at the plates of these tubes.

The plates of tubes 307 and 311 are connected through a capacitor 312 and resistor 313 to the grid of tube 314 included in the pulse former 315. This pulse former 315 is similar to those previously described so that its plate voltage is normally at a relatively low value because the tube is normally fully conductive. Each negative-going voltage variation at the plates of tubes 307 and 311 causes tube 314 to become momentarily nonconductive so that a positive-going pulse appears on wire 83 supplying the step counter 33. Each of these positive-going voltage variations is effective on the step counter 33 to cause it to advance a single step in its counting operation as will readily be understood from the description of the counters already given.

The mark output of carrier receiver 31 appearing on wire 301 is also applied through capacitor 299 to the grid of cathode follower tube 316. The grid of this tube is connected through a resistor 317 to ground, and this resistor is shunted by diode 318. The plate is connected directly to (B+), and the cathode is connected through the load resistor 319 to ground. Diode 318 acts as a clamper or D.C. restorer in that it tends to prevent the voltage at the grid of tube 316 from decreasing below ground level. Thus, it may be considered that each positive-going input pulse to the tube has its base line clamped to zero volts. Thus, each input pulse produces an output pulse at the cathode of tube 316 that is substantially independent of any distortion in average value resulting from passing these pulses through capacitor 299. The output of this cathode follower tube 316 appearing on bus 320 is applied to a pentode tube included in each storage unit gating circuit such as the tube 321 shown in Fig. 3C as being included in the storage unit gating circuit for station No. 0.

Each storage unit gating circuit receives gating voltages from the units station counter 74 and tens station counter 90 and is thereby made effective on a particular station period to route the incoming indication code to the proper one of the plurality of storage units which are provided, one for each station in the system. The storage unit gating circuit shown in Fig. 3C as being provided for station No. 0 comprises the pentode amplifier tube 321. This tube 321 has its cathode connected to the junction of voltage dividing resistors 322 and 323 which thereby provide a positive biasing voltage for the cathode sufficient to maintain this tube normally nonconductive. This biasing voltage is maintained at a steady level by the capacitor 324 shunting resistor 323.

The grid of tube 321 is connected through resistors 325 and 326 to (B+). The junction of these two resistors is also connected through respective diodes to one stage of the units station counter 74 and to one stage of the tens station counter 90. An "and" gating circuit is thereby provided which enables tube 321 to be conductive only when those particular stages of the units and tens station counters have their cold cathode tubes in conductive conditions. Thus, if tube 168 of the tens station counter 90 is nonconductive, a circuit is established from (B+), through resistor 326, diode 327, and resistor 328 in the cathode circuit of cold cathode tube 168, to ground. The relative values of resistance of resistors 326 and 328 then causes the grid voltage of tube 321 to be so low with respect to the positive cathode that the tube cannot be conductive.

The grid of tube 321 is similarly connected through diode 329 and over bus 330 to the cathode circuit of tube 84 included in the stage No. 0 of units station counter 74 in Fig. 3D. Consequently, if either tube 168 or tube 84 is nonconductive, the grid-cathode voltage of tube 321 remains sufficiently negative so that this tube cannot conduct. However, if both tubes 168 and 84 are concurrently in conductive conditions, the voltage at the junction of resistors 326 and 325 cannot drop appreciably below that provided by the cathode circuits of the tubes 168 and 84. This voltage, when these tubes are conductive, causes the voltage on the grid of tube 321 to be sufficiently high so that this tube can conduct provided only that its screen grid is then also sufficiently raised in potential with respect to the positively biased cathode to make it possible for conduction to occur.

In this way, the two station counters, one for units and the other for tens, are effective to select on each station period a different storage unit gating circuit, and the particular one so selected can have its pentode tube then made conductive in response to each positive-going pulse applied to its screen grid from the mark cathode follower shown in Fig. 3A. In this way, on the first station period of each cycle, tube 321 is made conductive for each occurrence of a mark in the received control code. Each time this tube becomes conductive, its plate voltage momentarily decreases to a much lower value, and this negative-going voltage variation is effective on the following pulse former including tube 335 so that a positive-going trigger pulse appears on bus 336. As a result, such a positive-going trigger pulse is applied to each cold cathode storage tube in the bank of storage tubes provided for the associated field station.

The positive-going trigger pulses corresponding to occurences of marks in received codes for station No. 0 are applied through coupling capacitors to all the cold cathode storage tubes of the associated bank. For example, a connection is made from bus 336, through capacitor 337 and resistor 338, to the grid of tube 339 of step No. 0. Although all of the cold cathode tubes of this particular bank of tubes are thus provided with these positive-going trigger pulses from bus 336, only a selected one of these tubes can be made conductive in response to each pulse because these tubes are successively gated by gating voltages obtained from the step counter 33. Each step of the step counter 33 supplies a gating voltage over an associated bus to corresponding steps of the storage units. For example, when step counter 33 is in the condition where its tube 75 of step No. 0 is conductive, a positive voltage appears on the associated bus 340. When tube 75 is nonconductive, this bus 340 is at ground potential.

At the beginning of the station period for the first station, the step counter at the central office is in its new condition. While in this condition, tube 75 is conductive and provides a positive gating voltage over bus 340 and through resistor 341 to the grid circuit of cold cathode tube 339 (see Fig. 3D). Thus, a trigger pulse on bus 336 occurring at a time when tube 339 has its grid thus positively biased can make only this particular tube 339 conductive.

More specifically, a mark pulse received on the first pulse period is not only effective to provide an output trigger pulse from the pulse former 315, but also causes the step counter 33 to advance a single step so that the tube of step No. 1 becomes conductive. Although tube 84 of step No. 0 is thus extinguished substantially in coincidence with the pulse provided by the pulse former 315 (see Fig. 5C, lines FF and II), the gating voltage provided by step No. 0 is still effective for a limited time since capacitor 73 cannot immediately discharge. Similarly, the capacitor associated with step No. 1 cannot immediately charge. Therefore, only tube 339 of stage No. 0 in the storage unit can be fired.

In a similar manner, the successive steps of the storage unit have their tubes positively biased in turn as the step counter 33 operates through its succession of steps. Therefore, a pulse on bus 336 occurring in the third pulse period of the indication code for a station finds only the tube of stage No. 2 properly biased so that only this particular tube can then be made conductive.

Although the tubes of other storage units for other field stations are at the same time gated by these voltages from the step counter 33, these other storage units are then not receiving trigger pulses from their associated storage unit gating circuit so that the cold cathode storage tubes of such other storage units are then not responsive to these other pulses. In this way, the received indication code is effective to fire the cold cathode tubes of the associated storage unit selectively according to the pattern of the received code.

The cold cathode tubes of the various storage units all tend to remain conductive when once controlled to such condition. To ensure that a change can be made on each cycle in the code stored for each station, all the cold cathode tubes of each storage unit are initially extinguished at the beginning of the station period for that station. This is accomplished by the storage clearout such as that shown in Fig. 3C for station No. 0. The gating voltage effective on tube 321 of the storage unit gating circuit is also applied through a capacitor 345 and through resistor 346 to the control grid of a gas discharge tube 347. The cathode of tube 347 is provided with the same bias voltage effective on the cathode of tube 321, and this bias voltage is effective to maintain this tube normally nonconductive. However, at the beginning of the station period for station No. 0, tube 347 is abruptly made conductive because the gating voltage applied to its control grid rises abruptly at that time. Tube 347 is provided with a connection from its plate through resistor 348 and capacitor 349 to ground. The purpose of this connection is to cause tube 347 to extinguish itself a brief interval after initially being fired. This circuit organization produces a plate-cathode voltage for the tube for a limited time after it is fired which is so low that the tube cannot remain conductive. Tube 347 is thus conductive for only a short time, and during this interval its normally high plate voltage is decreased to a very low value to provide a sharp negative-going voltage pulse at its plate.

The plates of all the various storage tubes such as tube 339 are connected through a resistor 340 and through associated circuit means shown in greater detail in Figs. 6A and 6B to a bus 350. This bus is connected through resistor 351 and normally closed contact 352 of the start push-button 123 to (B+), and is also connected through capacitor 353 to the plate of tube 347. Operation of the start push-button 123 results in the opening of contact 352 so that any cold cathode storage tube then in a conductive condition is extinguished. This action thus results in the clearing out of any stored indications. The negative-going voltage pulse at the plate of tube 347 is also effective to reduce the voltage on bus 350 and the extent and magnitude of this voltage decrease is such that it results in the extinguishing of any cold cathode tube in this bank provided for station No. 0. Thus, all the tubes of this bank are restored to their initial condition at the beginning of the station period for station No. 0.

During the course of this station period, a new indication code is received from station No. 0, and this newly received code then causes the selective firing of all the various storage tubes in the storage unit provided for this station in the manner already described. If there is no change in the indication code then all the storage tubes extinguished by the storage clearout at the beginning of the station period are again restored to their conductive conditions so that at the end of the station period all the tubes of this storage unit are in the same condition they were in at the beginning of that station period.

Fig. 7A illustrates in somewhat fuller detail the manner in which various devices at a typical field station may be effective in forming a distinctive indication code. A typical siding location is shown having a switch machine 1SM, a signal 1R governing the movement of trains to the right, signals 1LA and 1LB governing the movement of trains to the left, and a track section 1T having an associated track relay 1TR. Relays 1NWP and 1RWP indicate the operated position of the switch controlled by switch machine 1SM. Relays 1RRGP and 1LRGP indicate the positions of the signals 1R, 1LA and 1LB. The time-spaced, positive-going pulses obtained from the step counter 135 appear selectively on wire 281 according to the positions of the relays as has been explained. The pulses are applied to the transmitter control amplifier 290 which then acts on the carrier transmitter 27 so that a mark is transmitted on each pulse period that a positive-going pulse is received by the transmitter control amplifier.

The distinctive pattern of characters received at the central office results in the selective firing of the cold cathode tubes included in the storage unit for the corresponding field station. If the indication relays are in conditions resulting in the transmission of marks on the first and fourth pulse periods, for example, then the cold cathode tubes of the first and fourth stages are fired and the lamps associated with these tubes are illuminated as shown in Fig. 7B. Consequently, a visual display is given which provides information as to the operated conditions of the various devices at each field station.

Fig. 6A illustrates the manner in which a cold cathode storage tube may control the illumination of an indication lamp. The plate of each cold cathode storage tube is connected through a resistor 590 and through the parallel combination of capacitor 591 and the primary winding of a saturable reactor 592 to a source of (B+) voltage which is obtained from the storage clearout circuit shown in detail in Fig. 9B. When cold cathode tube 593 is nonconductive, there is no flow of current through the primary winding of the saturable reactor so that the secondary winding of this reactor presents a high impedance to the flow of alternating current in the secondary circuit. As a result of this high impedance, insufficient current flows in the secondary circuit to illuminate the indication lamp 594. When tube 593 is fired, however, the opposite conditions prevail. The flow of plate current through the primary winding then reduces the impedance presented by the secondary winding to such an extent that sufficient current from the A.C. source flows through the filament of lamp 594 to illuminate this lamp. Thus, a visual indication is given of the operated condition of cold cathode storage tube 593.

A capacitor 591 shunts the primary winding of the saturable reactor 592. When tube 593 is fired, this capacitor 591 is charged. When tube 593 becomes momentarily nonconductive on each cycle just as the new indication code for the associated field station is received, the charged capacitor 591 discharges through the primary winding to hold this winding momentarily energized. As a result, the indication lamp 594 remains illuminated even though the tube 593 is momentarily extinguished. Of course, if the tube 593 remains extinguished for an appreciable length of time, the capacitor 591 becomes fully discharged and can then no longer supply current to the primary winding of saturable reactor 592. In that event, the lamp 594 is extinguished.

When it is desired to control an electromagnetic relay rather than an indication lamp in accordance with the condition of a cold cathode storage tube, the circuit organization shown in Fig. 6B may be used. The plate of the cold cathode storage tube 595 is then connected through the winding of an indication relay 596 to a source of (B+) energy included in the storage clearout circuit. When the tube is nonconductive, the relay is dropped away; when tube 595 is fired, the relay is picked up. Resistor 597 and rectifier 598 connected in parallel with the winding of relay 596 provide this relay with slow releasing characteristics. As a result, this relay remains picked up even though the cold cathode storage tube 595 is made momentarily nonconductive for a brief interval on each cycle at the time it receives a new indication code from the associated field station.

SINGLE STATION SYSTEM

In the single station system of this invention, there is, of course, no need for station counting so that station-call pulses are not required to be transmitted from the central office. To further simplify the system, the repetition rate for the system is established by a free-running multivibrator at the field station so that timing pulses also are not required to be transmitted from the central office.

The single station system is organized to provide for the transmission of a large number of indications between the field station and central office; in the embodiment shown in the drawings, a complete cycle of operation comprises 100 pulse periods of ten millisecond duration each. Either a mark or a space character may be transmitted on each pulse period. A space is transmitted by sending the predetermined nominal carrier frequency for an interval of five milliseconds followed by a five millisecond "off" period in which no carrier is transmitted. A mark character is similar except that the carrier frequency is shifted to a slightly different value.

At the end of each cycle, it is desirable, as in the multiple station system, to reset the central office counting circuits to their zero conditions so that they can properly count in the coming cycle. To accomplish this, a synchronizing period is provided which is distinctive in the cycle in that the field station ceases to transmit any carrier for a brief interval. This distinctive period of silence is detected at the central office and results in the restoration of the counting circuits to their initial conditions.

Since the transmission of intelligence in the single station system originates entirely at the field station rather than at the central office as in the multiple station system, the description of the single station system logically begins with an account of the circuit organization and manner of operation of the typical field station shown in Figs. 8A and 8B.

*Field station apparatus*

The repetition rate for the entire system is established by a 100 cycle per second free-running multivibrator 400. This multivibrator 400 is similar to the free-running multivibrator 15 provided for the multiple station system and shown in Fig. 3A. Normally, tube 401 included in the synch period multivibrator 402 is conductive since the control grid of this tube is connected through resistor 403 to (B+). The cathode of tube 404 is thus normally connected through a low impedance circuit to ground so that a symmetrical circuit organization exists for tubes 404 and 405 of this multivibrator 400. These two tubes then alternate between conductive and nonconductive conditions with each tube remaining conductive for a five millisecond interval before it is extinguished so as to provide a period of operation for this multivibrator of ten milliseconds. The output of this multivibrator is taken from the plate of tube 405 and appears as a square wave of voltage alternating between high and low levels in the manner shown in Fig. 10A at line A.

The square wave output voltage of the multivibrator 400 is applied over wire 406, through capacitor 407 and resistor 408, to the control grid of triode amplifier tube 409 which is included in the step counter driver 410. This driver circuit comprises a pulse forming circuit similar to those previously described so that each negative-going voltage variation appearing on wire 406 results in the appearance of a positive-going trigger pulse at the plate of this tube 409. A capacitor 411 is connected to the junction of resistors 412 and 413 appearing in the plate circuit of this tube for the purpose of limiting the amplitude of the positive-going pulses in a manner that has previously been described. The output of positive-going trigger pulses obtained from the step counter driver 410 is as shown at line B of Fig. 10A.

The step counter 415 of Fig. 8A is similar to the decade counters used in the multiple station system and which have already been described. One difference with respect to the counter 415 is that it employs an electromagnetic relay 416 having its winding energized by the current passing through bus 417 which is the common plate supply bus for all the tubes of the counter. This relay 416 is provided to ensure that the counter will be put into proper operating condition when power is applied to the system.

When all power is removed from the system, all the tubes of the counter, of course, become nonconductive. However, the firing of any cold cathode tube is dependent upon its receiving an enabling bias voltage from the conducting tube of a preceding stage. Since no tube is conductive when power is again applied to the system, such enabling bias cannot be obtained so that some other means must be provided to put the counter into operating condition. Thus, when power has been removed so that all counting tubes of the step counter 415 are nonconductive, there is no current drawn by any of these tubes from bus 417 so that relay 416 is dropped away. Under these conditions, a circuit is closed from the terminal (B+), through resistor 418, and back contact 419 of relay 416, to the junction of resistors 420 and 421 in the cathode circuit of tube 422. At the instant power is first applied to the system, this connection from (B+) to the cathode circuit of tube 422 causes a positive biasing voltage to be applied over wire 423 and through resistor 424 to the grid of cold cathode tube 425 of step No. 1. This positive bias voltage is of the same amplitude that would be provided to the grid of tube 425 if tube 422 were in a conductive condition. Consequently, the first positive-going trigger pulse to appear on the input bus 414 results in the firing of tube 425 since this is the only tube of the counter then receiving the enabling bias voltage on its grid.

As soon as tube 425 is fired, it draws plate current from bus 417 which causes relay 416 to pick up and open its back contact 419. This opens the circuit from (B+) to the cathode circuit of tube 422 so that the enabling bias is removed from tube 425. The counter then responds in the usual manner to the input pulses on bus 414 and since one counting tube is always conductive, relay 416 remains picked up.

The step counter 415 is organized as a ring or repeating type counter in that the occurrence of a positive-going trigger pulse on bus 414 when tube 422 of step No. 9 is fired causes the firing of tube 425 of step No. 0. Thus, this counter 415 operates repeatedly through a cycle of operation for each ten input pulses it receives from the step counter driver 410.

Each time the step counter 415 is restored to its initial condition with tube 425 conductive, a positive-going voltage variation appears at the junction of resistors 426 and 427. This voltage variation is applied over wire 428, and through capacitor 429, to the grid of triode amplifier tube 430 included in the group counter driver 431. Tube 430 is normally biased to be nonconductive as a result of the connection of its cathode to the junction of voltage dividing resistors 432 and 433 connected between (B+) and ground. The positive-going voltage variation on bus 428, however, momentarily raises the grid-cathode voltage of tube 430 so that it conducts. The normally high plate voltage of the tube is then reduced by the flow of current through plate load resistor 434 so that a negative-going voltage pulse appears at the plate of this tube and is applied through capacitor 435 and resistor 436 to the grid of pulse forming triode tube 437. The pulse former comprising tube 437 is similar to that included in the step counter driver 410 so that each negative-going voltage variation experienced at the plate of tube 430 produces a positive-going trigger pulse at the plate of tube 437.

These positive-going trigger pulses are applied over wire 438 to the input bus of the group counter 439 shown in Fig. 8B. Fig. 10A shows graphically at lines C—F the operation of the step counter 415 as it advances a step for each trigger pulse it receives from the step counter driver. The group counter driver 431 is shown as providing a positive-going trigger pulse that is substantially coincident with the firing of tube 425 of step No. 0 included in the step counter. Each of these output pulses of the group counter driver 431 causes the advance of a single step of the group counter 439 as represented in lines H—K of Fig. 10A.

The group counter 439 is similar to the step counter 415 so that its operation need not be described in detail. This counter is also provided with a relay in its common plate supply bus, and the function of this relay is similar to that provided by relay 416 associated with step counter 450.

Thus, throughout a cycle of operation the free running multivibrator 400 is effective to generate pulses at the rate of 100 per second. Each of these pulses results in the generation of a trigger pulse from the step counter driver 410, with each such trigger pulse being effective to advance the step counter 415 by a single step. Each time the step counter 415 is restored to its initial condition with tube 425 conductive, it provides an output to the group counter driver 431 so that a positive-going trigger pulse appears on bus 438. These trigger pulses are each effective to advance the group counter 439 by a single count. The two counters 415 and 439 are, therefore, together effective to identify each pulse period of a cycle of operation.

The group counter 439 is also organized to operate as a ring or repeat type of counter. Thus, when this counter 439 receives an input trigger pulse on bus 438 at a time when tube 440 of its stage No. 9 is conductive, tube 441 of step No. 0 will immediately be fired since this tube will then be receiving the required enabling bias over wire 442.

Each time the group counter 439 is thus restored to its initial condition, it denotes the completion of another cycle of operation. It is at such time that the field station should, for a predetermined interval, cease its transmission of indication pulses to thereby form the distinctive synchronizing period. To accomplish this, a connection is provided from the cathode circuit of tube 441, over wire 443, through capacitor 444 and resistor 445, to the control grid of triode amplifier tube 446 included in the synchronizing period gate 447.

Each time the group counter 439 is restored to its initial condition with tube 441 conductive, there is an abrupt rise in voltage at the junction of resistors 448 and 449 in the cathode circuit of tube 441. This voltage rise charges capacitor 444 so that a positive-going voltage pulse appears at the grid of tube 446. This tube is normally biased to be nonconductive by reason of the connection of its cathode to the junction of voltage dividing resistors 477 and 448 connected between (B+) and ground. The positive-going pulse at the grid of tube 446, however, causes this tube to become momentarily conductive so that a negative-going voltage pulse appears at the plate of this tube as a result of the flow of plate current through the plate load resistor 449. This negative-going pulse is applied through the coupling capacitor 450 to the control grid of triode tube 401 included in the synchronizing period multivibrator 402.

As previously described, this multivibrator 402 is normally in the condition where its tube 401 is conductive. However, the negative-going trigger pulse appearing at the grid of tube 401 at the end of a cycle abruptly reverses the state of this multivibrator so that tube 401 becomes nonconductive and tube 451 becomes conductive. As soon as tube 401 becomes non-conductive, it no longer presents a low impedance connection to ground for the cathode of tube 404. The result is that the multivibrator 400 becomes inoperative and can no longer supply output pulses to either the step counter driver 410 or to the carrier transmitter 452. This condition persists for a length of time during which capacitor 453, included in the multivibrator 402, discharges. As this capacitor discharges, the voltage at the grid of tube 401 rises. When the grid-cathode voltage of tube 401 has risen sufficiently to make this tube conduct a slight amount of current, the multivibrator 402 immediately reverses its condition so that tube 401 again becomes fully conductive and allows the multivibrator 400 to continue its operation.

The multivibrator 402 remains in the condition where its tube 401 is nonconductive for an interval approximately equal to the time required for the step counter to operate once through its various steps; in other words, the multivibrator 402 remains in such condition for approximately 100 milliseconds. During this time, the master "clock" at the field station is, in effect, rendered inoperative so that the counters 415 and 439 cannot operate nor can the carrier transmitter 452 receive any input. As a result, there is no output from the field station for this time with the result that the distinctive synchronizing period is formed.

Each time the cold cathode counting tubes of step counter 415 are successively made conductive, the output buses respectively connected to the steps of the counter are raised in potential. As an example, during each ten millisecond pulse period that step No. 0 of this counter is in the condition where its tube 425 is conductive, the normally grounded bus 600 is supplied with a positive gating voltage as a result of the voltage drop then produced by the flow of plate-cathode current of tube 425 through cathode resistor 427. Only a representative few of the ten stages that would ordinarily be used in the counter 415 are shown in Fig. 8A. In the actual circuit organization employing ten such stages, a separate bus is provided for each stage. Connections are made from these buses such as the buses 600—605, through a matrix of isolating rectifiers, contacts of indication relays, to a bus 601 which is then connected to the grid circuit of a pentode amplifier tube 462 included in the mark gate amplifier 463 of Fig. 8A.

Each time the step counter 415 operates through all its ten steps, the group counter 439 has a different one of its tubes in a conductive condition. Thus, it may be considered that successive groups, each comprising ten pulse periods demarcated by the step counter, are formed. On each of these groups, a different set of indication relays is effective to control the make-up of a code appearing on bus 601. The particular group of indication relays selected at any time is in accordance with the condition of the group counter 439 at that time. The resulting pattern of gating voltages appearing on bus 601 is effective, through the mark gate amplifier 463, to control the carrier transmitter 452 to transmit a corresponding pattern of marks and spaces from a field station.

As an example, as the step counter 415 is operated through its ten steps successively for the first time following the synchronizing period, the group counter 439 is in the condition where tube 441 of its stage No. 0 is conductive. A connection is made from the junction of resistors 448 and 449 included in the cathode circuit of tube 441 through a rectifier 466 to wire 467. When tube is conductive, a gating voltage is provided by this connection so that the gating voltages on the buses 600—605 can then be selectively made to appear only on wire 467 and not on other wires such as wire 468 which is controlled by another group of indication relays.

When tube 441 is nonconductive, any positive gating voltages obtained from buses 600—605 and selectively applied through contacts of the indication relays such as relays 3TR, 3LRGP, etc., are, in effect, dissipated. This occurs because these positive voltages encounter the relatively high resistance of the resistor 469 and the low forward resistance of rectifier 466 in series with the relatively low resistance of resistor 449. A voltage divider is thus formed in which there is a substantial voltage drop across resistor 469 so that the gating voltages are substantially reduced in amplitude at the junction point 470. However, during the ten pulse period interval that tube 441 is conductive, the voltage at the junction of resistors 448 and 449 is raised. The voltage on wire 467 cannot then fall appreciably below that appearing at the junction of these resistors so that these gating voltages from buses 600—605 are not appreciably reduced in amplitude. On those particular pulse periods that the contacts of the indication relays prevent the appearance of these positive gating voltages on wire 467, no voltage can appear on wire 467 even though tube 441 is conductive because the positive voltage provided by the cathode circuit of this tube encounters the high back resistance of rectifier 466.

In a similar way, the second group of indication relays including relays 4TR, 4LRGP, etc. is effective to control the makeup of the code on wire 461 the second time the step counter 415 is operated throughout its various steps because at this time tube 471 of stage No. 1 in group counter 439 is conductive.

Tube 462 included in the mark gate amplifier 463 is normally biased to be substantially nonconductive because of the flow of screen current through its cathode resistor 472. On selected pulse periods as determined by the indication relays, positive gating voltages appear on bus 461, and these are applied through resistor 473 to the control grid of this tube. These positive gating voltages so raise the grid-cathode potential that the tube can conduct provided only that its suppressor grid is at the same time sufficiently raised in potential with respect to the cathode.

The suppressor grid of tube 462 receives a positive gating voltage from the free-running 100 cycle per second multivibrator 400. Each time tube 405 becomes nonconductive so that its plate voltage is raised, a positive-going voltage pulse charges capacitor 474 and results in the raising of the suppressor grid potential.

The function of the mark gate amplifier 463 is, as already explained, to gate the carrier transmitter 452 on selected pulse periods so that a mark rather than a space will be transmitted. However, each carrier pulse transmitted is desired to be of approximately five milliseconds duration, whereas the input to the mark gate amplifier 463 over bus 461 comprises pulses each of ten milliseconds duration. However, the pulses applied to the suppressor grid of tube 462 are of five milliseconds duration so that tube 462 concurrently receives gating voltages on its control and suppressor grids for only the required five millisecond intervals. Thus, on each pulse period that tube 462 has its control grid positively gated, its suppressor grid is positively gated by the multivibrator 400 for approximately one half of the ten milliseconds interval. Consequently, a five millisecond, negative-going voltage pulse appears at the plate of this tube 462 and is applied to the mark input of carrier transmitter 452.

The positive-going voltage pulse obtained from the multivibrator 400 and applied to the suppressor grid of tube 462 is also applied directly to the space input of the carrier transmitter. Each such positive-going input pulse to the space input, in the absence of a negative-going pulse to the mark input, causes the carrier transmitter to transmit at its nominal frequency designated for the transmission of indications so that, in effect, a space character is transmitted. However, the appearance of a negative-going pulse on the mark input of the transmitter concurrently with a positive-going pulse on the space input causes the output frequency of the carrier transmitter 452 to be shifted slightly so as to form the distinctive mark pulse. The resulting carrier pulses formed by the carrier transmitter are passed through the band pass filter 475 to line wires 476 which connect this field station with the central office.

*Central office apparatus*

The distinctive code of mark and space carrier pulses transmitted from the field station over line wires 476 is received at the central office (see Figs. 9A and 9B) and passed through a band-pass filter 480 to the carrier receiver 481. This carrier receiver is similar to those provided for the multiple station system. It includes frequency discriminating means which is effective to provide a positive-going voltage pulse on the output wire marked "space output" for each occurrence of a space character in the indication code. Likewise, a positive-going voltage pulse appears on the wire marked "mark output" for each mark character in the indication code.

The pulses appearing on the space output of the receiver 481 are applied through a capacitor 482 and resistor 483 to the grid of a triode amplifier tube 484. The mark output pulses are similarly applied to the grid of triode amplifier tube 485. Both cathodes of tubes 484 and 485 are connected to the junction of the voltage dividing resistors 486 and 487 connected between (B+) and ground. The positive cathode voltage thus effective on these tubes results in their being normally in a cut-off condition. The plates of both tubes are connected through a common load resistor 488 to (B+). When both tubes 484 and 485 are in their normal nonconductive conditions, their common plate voltage is at a relatively high level. However, each occurrence of a space or a mark in the received indication code causes tubes 484 and 485 respectively to become momentarily conductive with the result that a negative-going voltage pulse appears at the plates of these tubes. In effect, therefore, the mark-space combiner 489 may be considered as providing a negative-going output pulse for each received indication code character, regardless of whether the character is a mark or a space. This output of the mark-space combiner 489 is illustrated graphically at line Q of Fig. 10B.

The output pulses of the mark-space combiner 489 are applied through a capacitor 490 and resistor 491 to the control grid of triode amplifier tube 492 included in the pulse relay 493. This pulse delay 493 operates in a manner similar to that of the pulse formers previously described. Thus, a negative-going voltage variation provided by the mark-space combiner 489 causes tube 492 to become nonconductive so that its plate voltage abruptly rises. As capacitor 490 discharges towards a new steady-state value, the voltage at the grid of tube 492 rises toward the cutoff level. After an interval, whose length is determined by the time constant in the discharging circuit for capacitor 490, tube 492 again becomes conductive and its plate voltage then abruptly decreases. The pulse delay 493 is organized so that tube 492 will remain nonconductive in response to a negative-going input pulse for approximately five milliseconds. At the end of that time, when tube 492 again becomes conductive, it provides a negative-going voltage variation through capacitor 494 and resistor 495 to the control grid of triode tube 496 included in pulse former 497. Pulse former 497 is similar to those previously described so that the negative-going input pulse it receives from pulse delay 493 results in the generation of a positive-going trigger pulse at the plate of this tube.

Fig. 10B shows at line S that the positive-going trigger pulses obtained from pulse former 497 and appearing on wire 498 occur substantially in coincidence with the trailing edge of the associated positive-going pulse obtained from the receiver 481. Thus, each negative-going trailing edge of the positive pulses obtained from the receiver, whether such pulse is due to a mark or a space, causes the output of the mark-space combiner to rise in voltage. Five milliseconds later, upon the occurrence of the positive-going leading edge of the next output pulse of the receiver, the output voltage of the mark-space combiner abruptly decreases. Each voltage drop of the mark-space combiner output (see line Q) causes the output of the pulse delay 493 to abruptly rise in voltage. Approximately five milliseconds later, the pulse delay restores itself to its normal condition so that its voltage drops to a low level. Each such drop in voltage is effective on the pulse former 497 to produce a positive-going trigger pulse on wire 498.

The positive-going trigger pulses on wire 498 are applied to the input bus 499 provided for the step counter 500. This step counter is a decade type counter having a single cold cathode tube for each step and is similar to those previously described. Each occurrence of a positive-going trigger pulse on the input bus 499 results in the advance of a single step by the counter. Both this counter and the group counter 501 have their common plate supply buses 502 and 503 for their counting tubes respectively connected through corresponding inductors and resistors to bus 504. This bus 504 is normally connected to (B+) through a normally closed contact 505 of the reset push-button 506. This reset push button 506 is provided so that if for any reason the step counter 500 or the group counter 501 should count improperly, all the tubes of either counter may be made nonconductive to thereby clear out the counters.

The step counter 500 is organized as a ring or repeat type of counting chain. Thus, a connection is made from the cathode circuit of the tube included in step No. 9 of this counter to the grid circuit of the tube in step No. 0. This connection provides the required enabling bias for the first step of the counter so that its tube will become conductive in response to an input pulse on bus 499 occurring at a time when the tube of step No. 9 is conductive.

Each time step counter 500 is restored to its initial condition with the tube of its step No. 0 conductive, a positive-going voltage variation appears on wire 510. This positive-going voltage is applied through a coupling capacitor 511 and through resistor 512 to the grid of triode tube 513 included in the group counter driver 514. Tube 513 is normally biased to be nonconductive because its cathode is connected to the junction of voltage dividing resistors 515 and 516 connected in series between (B+) and ground. With tube 513 normally nonconductive, its plate voltage is at a high level. However, the positive-going voltage variation appearing on wire 510 each time the step counter 500 is restored to its initial condition, causes the tube 513 to become momentarily conductive. When this occurs, there is a sudden decrease in voltage at the plate of this tube, and this negative-going voltage variation is then applied through capacitor 517 and resistor 518 to the grid of triode tube 519.

Tube 519 is included in a pulse forming circuit similar to those previously described so that each negative-going voltage variation it receives from the plate of tube 513 causes a positive-going voltage pulse to appear on the input bus 520 for the group counter 501. The group counter 501 is similar to the step counter 500. Each positive-going trigger pulse on the input bus 520 causes this counter to advance its count by a single step.

The field station apparatus already described includes the step counter 415 and group counter 439, both of which are decade counters. Together they are effective on each cycle of operation to cause 100 successive indication code characters to be transmitted from the field station to the central office. The step counter 500 and group counter 501 provided at the central office similarly have a counting capacity of 100 counts. Thus, in a complete cycle, the step counter 500 operates through its cycle of operation 10 times. Each time it is restored to its initial condition so as to start another cycle of ten steps, it causes the group counter 501 to advance by a single count. At the end of the cycle, the group counter is in the condition where the tube of its step No. 9 is conductive. Since the synchronizing period is included in the cycle to provide for the resetting of the counters at the central office, there is no need to have the group counter 501 operate as a ring or repeat type of counting chain. Thus, at the end of the cycle, the group counter 501 remains with the tube of its step No. 9 conductive until the synchronizing period has been detected by the synch period detector 525. When the synchronizing period has been detected, resetting pulses are applied to both the step counter 500 and group counter 501 to reset these counters to their initial conditions so that they may start the new cycle in the proper condition.

The synch period detector 525 receives input pulses from the mark-space combiner 489 over wire 526. These pulses are applied through a capacitor 527 to the cathode of a diode 528 which has its cathode connected to ground through resistor 529. Each positive-going voltage variation on wire 526 raises the potential at the cathode of diode 528 and merely makes the diode nonconductive. However, each negative-going voltage variation causes the diode to conduct and results in the charging of capacitor 530 through resistor 531. The repeated charging of capacitor 530 which occurs as pulses are continually received during a cycle, causes capacitor 530 to become and remain charged with a negative voltage which is effective to hold the gas discharge tube 532 nonconductive. However, during the synchronizing period when no pulses are received at the central office, capacitor 530 discharges through resistor 547. After a brief interval, the control grid voltage of tube 532 raises sufficiently so that this tube is fired.

The plate of gas discharge tube 532 is connected through a resistor 533 and capacitor 534 to ground. When tube 532 is fired, capacitor 534 abruptly discharges through the plate-cathode circuit of tube 532. It has been observed that an oscillatory voltage variation occurs in the plate-cathode voltage of the tube momentarily with the result that this voltage momentarily decreases below that required to maintain the tube conductive. Consequently, tube 532 extinguishes itself a brief interval after it is fired. During this interval that tube 532 is fired, its normally high plate voltage is reduced to a very low value so that a negative-going voltage pulse appears at the plate of this tube and is applied over wire 535 and through capacitor 536 and resistor 537 to the grid of tube 538 included in the No. 0 stage of counter 501.

Although the cold cathode counting tubes are normally fired by the application of a positive-going trigger pulse to their grids, these tubes can also be fired by applying a negative-going voltage pulse of sufficient amplitude to their grid. Consequently, the negative-going voltage pulse obtained from the plate of gas discharge tube 532 during the synchronizing period is effective to fire tube 538 of the group counter 501 so as to restore this counter to its initial condition. The firing of tube 538, of course, results in the extinguishing of any other counting tube of the group counter 501 in a manner as previously described.

The negative-going voltage pulse obtained from the plate of tube 532 in the synchronizing period is also applied through a capacitor 540 to the control grid of tube 541. This tube 541 is included in a pulse forming circuit which causes a positive-going trigger pulse to appear on the wire 542 for each negative-going input pulse applied to the grid of this tube. The positive-going trigger pulse appearing on wire 542 in the synchronizing period is applied through an isolation rectifier 543 and through resistor 544 to the grid of tube 545 included in step No. 0 of step counter 500. This positive-going trigger pulse results in the firing of this tube 545 to thereby restore the step counter 500 to its initial condition. The firing of tube 545 results in the extinguishing of any other tube of the step counter 500 then in a conductive condition.

As already mentioned in describing the cold cathode tube counters of this system, some means must be provided to put the counter into operation when power is first applied to the system. Each counter is organized so that one of its cold cathode tubes can be made conductive by an input pulse only if this tube is then receiving an enabling bias voltage from an already fired counting tube from some other stage of the counter.

When power is removed from the system, all the counting tubes are extinguished. When power is first applied, therefore, none of the counting tubes can respond to the counter input pulses since none of them is receiving the required bias voltage. This difficulty is overcome with the step counter 500 and group counter 501 at the central office by providing them with resetting pulses which are of such large amplitude that they will cause the tube of the No. 0 stage of each counter to become fired irrespective of whether it is then receiving a bias voltage from some other stage.

The resetting pulses obtained from the plate of gas discharge tube 532 included in the synch period detector 525 and applied to the grid of cold cathode tube 538 is of such large amplitude that it will cause this tube to be fired even though this tube does not receive any enabling bias from another stage of the counter. Tube 545 included in step No. 0 of step counter 500 receives its resetting pulse from the plate of tube 541 included in the synch period detector 525. The amplitude of this pulse substantially equals the amplitude of voltage of the (B+) source and is thus effective to make tube 545 conductive regardless of whether this tube is then receiving bias from the No. 9 step of the step counter 500 or not. Thus, the resetting voltages that the counters 500 and 501 receive on each synch period of this cycle are also effective to put each counter into its proper operating condition when power is first applied to the system.

An indication storage unit is provided for each group of indications transmitted from the field station. Since there are ten pulse periods in each group, on each of which a mark or space code character may be transmitted, the storage unit for each group includes ten cold cathode storage tubes. Each tube of the storage unit is made conductive as a mark character is received on the corresponding pulse period and nonconductive if a space character is received.

A storage unit gating circuit is associated with each indication storage unit. Each of these storage unit gating circuits receives input pulses corresponding to each occurrence of a mark in the received indication code. These storage unit gating circuits are selectively gated in turn by the group counter 501 so that only one of them can respond to the mark pulses at any given time and thus provide output pulses which will selectively fire the cold cathode tubes of the associated indication storage unit.

As with the multiple station system previously described, the indication storage unit for each group of indications has all its cold cathode tubes restored to nonconductive conditions just prior to the reception of a new group of indications for that storage unit. This is accomplished by the storage clearout 578 which is also gated by the group counter 501 so that it becomes effective to clear out the associated indication storage unit just before the new group of indications for that storage unit is received.

More specifically, the positive-going output pulses appearing at the mark output of the carrier receiver 481 are applied through a capacitor 550 to the control grid of a cathode follower amplifier tube 551. The grid of this tube is connected through the parallel combination of resistor 553 and rectifier 554 to ground. Rectifier 554 acts as a clamper or D.C. restorer; it is effective to prevent the grid voltage of tube 551 from going below ground in response to the input pulses this grid receives from the carrier receiver. Resistor 555 is the cathode load resistor for this mark cathode follower 552.

The positive-going cathode output pulses of tube 551 appear on bus 556, and from here they are applied to the screen grid of the pentode amplifier tube included in the storage unit gating circuit for each group of indications. Thus, a connection is made from this bus 556, through resistor 557, to the screen grid of pentode tube 558 included in the storage unit gating circuit 578 for group No. 0.

This tube 558 is normally nonconductive because its cathode is connected to the junction of voltage dividing resistors 559 and 560 connected between (B+) and ground. Tube 558 can be made conductive, however, provided that its screen and control grids are at the same time made sufficiently positive with respect to the positively biased cathode.

The control grid of tube 558 is connected to bus 599. When the associated tube 538 of group counter 501 is nonconductive, this bus 599 is at ground potential with the result that the control grid voltage of tube 558 is then too low to permit this tube to conduct even though its screen grid may then be receiving positive pulses over bus 556. However, whenever the group counter 501 is in the condition where tube 538 is conductive, bus 599 is sufficiently raised in voltage that the cut-off bias for tube 558 is overcome. Then each positive-going pulse on bus 556 causes tube 558 to become momentarily conductive so that negative-going voltage pulses appear at the plate of tube 558.

These negative-going voltage pulses are applied through a capacitor 561 and resistor 562 to the grid of triode tube 563. Tube 563 is included in a pulse forming circuit which is effective to provide a positive-going trigger pulse on bus 564 for each negative-going input appearing at the grid of tube 563. Therefore, during the time that group counter 501 is in the condition where tube 538 of its stage No. 0 is conductive, each mark received at the central office causes a positive-going trigger pulse to appear on bus 564 associated with the indication storage unit for group No. 0.

A connection is made from bus 564 through a coupling capacitor to each cold cathode storage tube of the indication storage unit for group No. 0. Although each of the cold cathode storage tubes thus receives a positive-going pulse on its grid whenever a mark is received, only the particular storage tube of the storage unit for group No. 0 that is on that particular pulse period being gated by step counter 500 can respond to the trigger pulse appearing on its grid. For example, on the particular pulse period that the tube of step No. 2 of step counter 500 is conductive, a positive gating voltage appears on bus 565 as a result of the flow of cathode current of this particular cold cathode tube through cathode resistor 566. Since the grid of cold cathode storage tube 567 is connected through resistor 568 and resistor 569 to this particular bus 565, tube 567 is on this particular pulse period receiving the positive biasing voltage it requires in order to become conductive in response to the positive-going trigger pulse appearing on bus 564. Thus, this particular cold cathode storage tube is selected out of the ten provided in this group on the third pulse period in the No. 0 group of indications.

At the beginning of the No. 0 group when tube 538 of the group counter 501 first becomes conductive, the positive-going voltage variation appearing then on bus 599 is applied through capacitor 575 and resistor 576 to the grid of gas discharge tube 577 included in the storage clear out 578 provided for group No. 0. The cathode of this tube 577 is provided with the same positive bias voltage that appears on the cathode of tube 558, and this positive cathode voltage maintains tube 577 in a normally nonconductive condition. However, at the beginning of group No. 0, the positive-going voltage variation on bus 599 raises the control grid voltage of tube 577 sufficiently so that this tube is fired. Tube 577 is provided with a self-extinguishing circuit means including the resistor 579 and capacitor 580 connected from its plate to ground, and as a result, tube 577 remains conductive only momentarily. The plate supply energy for all the cold cathode storage tubes of this group is obtained from bus 582 which is connected through a resistor 583 and wire 584 to bus 504, which is then connected through normally closed contact 505 of reset push-button 506 to (B+). When tube 577 is fired at the beginning of the No. 0 group period, capacitor 581 suddenly discharges and produces a large voltage drop across resistor 583. This momentarily reduces the voltage on bus 582 to such a low level that all the cold cathode storage tubes having their plates connected to this bus are immediately extinguished. In this way, all previously stored indications for this particular group are cancelled. As the new indication code is received for this particular group, the cold cathode storage tubes associated therewith are selectively fired once more. Any change in the indications occurring in the new cycle can thus be immediately displayed and stored in the associated storage unit. If, for any reason, it is desired to cancel the stored indications, the reset push button may be depressed to open contact 505. This results in removal of energy from all the cold cathode tubes so that they are all restored to nonconductive conditions.

Either an indication lamp or an electromagnetic relay may be directly controlled by each cold cathode storage tube. The manner in which this may be accomplished has been shown in Figs. 6A and 6B and described in connection with the multiple station system of this invention.

In the description of the invention that has been given, the description and drawings have related to systems having a definite capacity. Thus, the counting circuits in the multiple station system have been shown as providing for the transmission of ten indications from each of forty different field stations, and the single station system has provided for the transmission of ten groups of ten indications each in a single cycle. These capacities may be altered to fit the particular requirements of any particular installation without departing in any manner from the scope of this invention. Also, the invention is not to be considered as limited to the transmission of information by means of carrier waves over line wires. Obviously, the intelligence can be transmitted in any of various ways, either over conductors or by space radio including microwave transmission.

Having described an electronic code communication system as one specific embodiment of this invention, I desire it to be understood that various other forms may be provided to illustrate the specific embodiment of this invention without in any manner departing from the spirit or scope of the present invention.

What I claim is:

1. In a continuous scanning electronic system for transmitting intelligence from a plurality of field stations to a central office over a communication circuit, transmitting means at said central office for transmitting a signal comprising on each regularly recurring cycle one of at least two different code characters on each of a plurality of regularly repetitive pulse periods whose frequency establishes the repetition rate of the system, the particular code character being transmitted by said transmitting means on predetermined ones of said pulse periods being of a distinctive character constituting station-call elements and demarcating successive groups of said pulse periods, normally inactive intelligence transmitting means at each field station, station counting means at each field station for counting said station-call elements and being controlled from a normal first condition to a second distinctive condition after counting a predetermined number of said station-call elements, a step counter at each field station being operated a step at a time by the respective code characters received at said field station after said station counting means has been controlled to said second distinctive condition to thereby demarcate said pulse periods, means operated by said step counter after said step counter has operated through a predetermined number of steps for controlling said step counter to be non-responsive to further received code characters, said station counting means and said step counting means acting jointly on said intelligence transmitting means to cause said intelligence transmitting means to transmit a signal to said central office only throughout the interval said station counting means is in said second distinctive condition and said step counter is being operated through said predetermined number of steps and with said signal comprising distinctive code characters on selected ones of the pulse periods demarcated by said step counter corresponding to the intelligence desired to be transmitted from said field station, means included in said transmitting means at said central office and effective when at least sufficient of said station-call elements have been transmitted by said transmitting means to have successively operated said station counting means at each field station included in said system to its said distinctive condition to cease all transmission of said two different code characters for a predetermined interval substantially longer than the normal interval between successive code characters to thereby form a distinctive synchronizing period prior to the transmission of the next cycle, and detecting means at each field station including an electronic timing circuit means being maintained in a first condition by the repeated occurrence of said two different code characters during each cycle but being operated to a second condition when said two different code characters are not received during said synchronizing period, said timing circuit means when operated to said second condition resetting said station counting means at each field station to an initial condition.

2. The system as defined in claim 1 wherein said detecting means when distinctively controlled also resets said step counter to an initial condition.

3. In a continuous scanning electronic system for transmitting coded intelligence on repetitive cycles from at least one indication transmitting station to an indication receiving station, transmission means at said indication transmitting station for transmitting to said indication receiving station on each cycle one of at least two different distinctive code characters on each of a stream of repetitive pulse periods according to the intelligence desired to be transmitted on the respective pulse period, counting means at said indication transmitting station for counting the number of said code characters transmitted each cycle and acting on said transmitting means when a predetermined count has been reached for interrupting the transmission of all said code characters for a preselected interval substantially longer than the interval between the transmission of successive characters during said cycle to thereby demarcate a synchronizing period, counting circuit means at said indication receiving station for counting said two different code characters received from said indication transmitting station, a plurality of indication storage devices at said indication receiving station each one corresponding to a respective pulse period in said cycle, circuit means controlled by said counting circuit means at said indication receiving station for successively controlling each of said indication storage devices to be selectively responsive to the code character received on the respective pulse period to thereby store the intelligence represented by said code character at said indication receiving station, and detector means at said indication receiving station including an electronic timing circuit means being maintained in a first condition by the repeated occurrence of said two different code characters during each cycle but being operated to a second condition when said two different code characters are not receiving during said synchronizing period, said detector means when operated to said second condition resetting said counting means at said indication receiving station.

4. In an electronic code communication system comprising at least one indication transmitting location and a receiving location connected by a communication circuit, means at said indication transmitting location for transmitting code cycles to said receiving location each comprising successive groups of repetitively occurring pulse periods on each of which one of at least two distinctive code characters may be sent, a receiver at said indication receiving location providing a distinctive output for each occurrence of a particular one of said two distinctive characters, first counting circuit means at said indication receiving station for counting and demarcating said groups of pulse periods, second counting circuit means at said indication receiving station for counting and demarcating said pulse periods occurring within a group, a storage unit at said indication receiving station for each of said groups of pulse periods comprising a plurality of two-state stages each corresponding to a respective one of said pulse periods in the associated group, gated input circuit means for each storage unit being jointly controlled by both said first counting circuit means and said distinctive outputs of said receiver and supplying an output to all said stages in the respective storage unit comprising a discrete electrical signal for each occurrence of said one particular distinctive character in the corresponding group of pulse periods, gating circuit means controlled by said second counting circuit means for sequentially rendering the successive stages of each storage unit capable on the respective pulse periods of each group of being operated to a distinctive condition by said output of the associated gated amplifier, and indication means for each stage being distinctively controlled according to the operative condition of the respective stage to thereby indicate whether or not said particular distinctive character was received on the respective pulse period.

5. In an electronic code communication system of the kind wherein each of a plurality of field stations is connected to a central office over a communication circuit, the combination comprising, means at said central office for transmitting successive cycles comprising groups of pulse periods on each of which pulse periods a distinctive code character is transmitted, first counting circuit means at said field station for counting said groups of pulse periods, second counting circuit means at each field station for counting said distinctive code characters occurring within a group and thereby demarcating said pulse periods in said group, circuit means controlled by said first counting circuit means for controlling said second counting circuit means to count said distinctive code characters only when said first counting means has counted a predetermined number of said groups, counter disabling circuit means receiving a distinctive input when said second counting means has counted a predetermined number of said distinctive code characters, said counter disabling circuit means upon receiving said distinctive input rendering both said first and second counting circuit means ineffective for further counting throughout the remainder of the cycle, and counter conditioning means being distinctively controlled prior to the beginning of each cycle to restore both said first and second counting circuit means to counting conditions.

6. The system as defined in claim 5 wherein at least one of said counting circuit means at said field station comprises an electronic counting chain of the type having a plurality of cold cathode grid glow tubes with one tube at a time of said chain normally being conductive and with the conductive tube providing an enabling bias voltage to a succeeding tube so that successive inputs applied to all said counting tubes successively render said tubes conductive in a predetermined order, said counter disabling means acting upon all said tubes in said counting chain upon receiving said distinctive input to extinguish all said tubes, said counter conditioning means when distinctively controlled acting on a selected tube of said counting chain to control it to a conductive condition in the absence of said enabling bias voltage.

References Cited in the file of this patent

UNITED STATES PATENTS

| | | |
|---|---|---|
| 2,399,473 | Desch | Apr. 30, 1946 |
| 2,426,278 | Mumma | Aug. 26, 1947 |

| | | |
|---|---|---|
| 2,584,739 | Rees | Feb. 5, 1952 |
| 2,629,088 | Kendall | Feb. 17, 1953 |
| 2,794,179 | Sibley | May 28, 1957 |

OTHER REFERENCES

"Multicathode Gas-Tube Counters," Electrical Communications, vol. 27, September 1950, No. 3 (pp. 214–226 relied on).

"A Cold-Cathode Scaling Unit," Electronic Engineering, May 1954 (pp. 186–191 relied on).